United States Patent
Freydel

(10) Patent No.: US 7,877,627 B1
(45) Date of Patent: Jan. 25, 2011

(54) MULTIPLE REDUNDANT COMPUTER SYSTEM COMBINING FAULT DIAGNOSTICS AND MAJORITY VOTING WITH DISSIMILAR REDUNDANCY TECHNOLOGY

(75) Inventor: Lev Freydel, Akron, OH (US)

(73) Assignee: Supercon, L.L.C., Akron, OH (US)

( * ) Notice: Subject to any disclaimer, the term of this patent is extended or adjusted under 35 U.S.C. 154(b) by 211 days.

(21) Appl. No.: 12/316,966

(22) Filed: Dec. 18, 2008

(51) Int. Cl.
*G06F 11/00* (2006.01)
(52) U.S. Cl. .............................. 714/11; 714/12; 714/55
(58) Field of Classification Search ............. 714/10–13, 714/36, 55; 326/11
See application file for complete search history.

(56) References Cited

U.S. PATENT DOCUMENTS

| | | | |
|---|---|---|---|
| 4,622,667 A | 11/1986 | Yount | 714/11 |
| 6,240,526 B1 * | 5/2001 | Petivan et al. | 714/11 |
| 6,367,031 B1 | 4/2002 | Yount | 714/11 |
| 6,449,732 B1 * | 9/2002 | Rasmussen et al. | 714/12 |
| 6,550,018 B1 * | 4/2003 | Abonamah et al. | 714/6 |
| 6,732,300 B1 * | 5/2004 | Freydel | 714/36 |
| 6,754,846 B2 | 6/2004 | Rasmussen et al. | 714/11 |
| 6,813,527 B2 | 11/2004 | Hess | 700/82 |
| 6,860,452 B2 | 3/2005 | Bacon et al. | 244/194 |
| 7,047,440 B1 * | 5/2006 | Freydel et al. | 714/11 |
| 7,209,809 B2 | 4/2007 | Yeh | 701/3 |
| 7,328,235 B2 | 2/2008 | Mori et al. | 709/202 |
| 7,328,371 B1 | 2/2008 | Kalyanasundharam et al. | 714/11 |
| 7,392,426 B2 | 6/2008 | Wolfe et al. | 714/11 |
| 2009/0158088 A1 * | 6/2009 | Hillman et al. | 714/11 |

* cited by examiner

*Primary Examiner*—Yolanda L Wilson
(74) *Attorney, Agent, or Firm*—Renner, Kenner, Greive, Bobak, Taylor & Weber

(57) ABSTRACT

A multiple redundant computer system includes three primary processor modules (PPM) and three redundant processor modules (RPM) operating synchronously. Primary and redundant processor modules are dissimilar in hardware and software for decreasing the probability of a common cause system failure. Each primary and redundant processor module receives input data from associated primary and redundant input modules respectively, executes control program and transfers output data to an output module. The output module produces a system output as the result of 2-out-of-3 voting among output data generated by PPMs. In response to PPMs hard failures, the output module still produces the system output as the result of 2-out-of-3 voting among output data generated by any combination of the PPM and the RPM. As such, the system is able to operate properly even though five-out-of six processor modules have failed. The output module also compares output data that it has received from each pair of the associated PPM and RPM for detecting a disparity between said output data due to the occurrence of transient faults. Additionally, the output module produces the system output as the result of 2-out-of-2 and 1-out-of-1 voting upon the occurrence of disparity of output data generated by the associated PPM and RPM in one and two pairs of the associated PPM and RPM respectively.

22 Claims, 7 Drawing Sheets

MULTIPLE REDUNDANT COMPUTER SYSTEM COMBINING FAULT DIAGNOSTICS AND MAJORITY VOTING WITH DISSIMILAR REDUNDANCY TECHNOLOGY

TECHNICAL FIELD

Generally, the present invention relates to multiple redundant computer control systems. In particular, the present invention relates generally to computer systems devoted to safety-critical and critical-control applications. More particularly, the present invention relates to multiple redundant computer systems that combine dissimilar redundancy technology with majority voting and fault diagnostic means to provide uninterrupted system operation in the presence of multiple permanent and/or multiple transient faults of system components.

BACKGROUND OF THE INVENTION

Real-time computer systems are often utilized in mission critical control systems where processed data is critical to maintaining human safety, environmental cleanliness, as well as the integrity of the equipment controlled thereby. For example, real-time computer systems are implemented to control the critical processes employed by oil extraction/refining processes, control of nuclear and chemical processing, aircraft control, patient monitoring in hospitals, and the control of military equipment, as well as others. As such, computing systems devoted to safety and critical controls must provide an extremely high degree of safety and reliability, since these computer systems carry out such processes that are susceptible to system faults or failures, which may result in significant economic losses, as well as exposing individuals to a potentially fatal event.

In particular, a system fault or failure is a physical defect, imperfection, or flaw that occurs within the hardware or software of the computer system. Such system faults can be classified as permanent if they cannot be corrected, or classified as transient if the faults appear and disappear within a short period of time. To prevent such system faults from leading to a complete failure of the computing system's operation, many computing systems operating in a mission critical environment provides fault tolerance, thus allowing the computing system to continue to perform its intended function in the presence of faults. For example, computer systems utilized in safety and critical industrial control are usually embodied using triple redundant module (TMR) architecture or a dual redundant architecture, such as a two-out-of-two (2oo2D) diagnostic architecture. The TMR systems usually combine self-diagnostics and fault recovery means with two-out-of-three voting to disable a faulty system component in the case of its permanent fault and to mask transient faults occurring in such components. The TMR system disclosed in U.S. Pat. No. 6,449,732 is able to operate properly in the presence of any single permanent or transient fault; however, in some cases this system may become inoperative when two concurrent system faults occur within system components such as output voter or power supply that can tolerate only a single fault.

In many safety-critical and critical-control applications where two faults or more must be tolerated, the TMR and 2oo2D systems are insufficient. In the hybrid triple redundant (HTR) computer systems, such as that disclosed in U.S. Pat. No. 6,732,300, includes three identical computing channels operating in parallel, and an output data voter that tolerates up to two faults of its components. Specifically, the HTR system remains operational in the presence of any two permanent faults and may continue to operate properly in the presence of certain kinds of three permanent faults. The HTR system is also able to detect and neutralize many transient faults, whereby the HTR disables the faulty channels, thus switching control of the output to an operational channel, while also automatically restoring system configuration after the disappearance of a transient fault.

Unfortunately, as in any TMR system, the HTR may fail in the event that all three of the HTR channels fail at the same time due to a common cause failure. One major source of a common cause failure is hardware and software design errors. For example, generic software design errors are a significant source of a computing system's failure, as the development of complex modern control systems increases the chances of software design errors. Since each computing channel of the TMR or HTR employs the same operating system, and executes the same control program, a single error or bug within the software can lead to the failure of each channel at the same time. In addition, environmental conditions may also be a source of common cause failures, such as in the case when the magnitude of the operating temperature exceeds the rating of the hardware components in each system channel, which lead to system failure. Thus, if redundant channels of the TMR or HTR are identical, they may suffer from the same design errors and react to environmental stress in exactly the same, but erroneous way that leads to system failure. In such event, the system becomes inoperable and must perform a false-trip, or a shutdown process that is not demanded by the process controlled by the computing system. Unplanned shutdowns may result in stopping production and therefore cause vast economic losses. Furthermore, such common cause failures may lead to a condition in which the control system will not be able to shutdown the controlled process when it is required. Such a condition is dangerous, as failure of the controlled system can cause the loss of human life and/or damage of expensive equipment.

Transient faults are characterized as those faults that appear randomly in hardware and/or software, which affect some computing components resulting in computation disruption but do not permanently damage the computing component. For example, transient faults may be caused by electromagnetic interference created by high-frequency signals or light propagating through the computing system into the communication lines and buses, causing memory elements to be set into erroneous logical states. Additionally, high-energy electromagnetic pulses created by power equipment when switched between ON and OFF states may also cause transient faults. Further, high-energy atomic particles, such as that created by cosmic radiation, may also deposit sufficient energy in the semiconductor elements to set electronic components, such as memories, into erroneous states. Thus, if the system channels are not physically isolated, the probability of a system failure increases due to the occurrence of transient failures, which can affect all system channels simultaneously or close together in time.

A known technique for enhancing computer system reliability is the utilization of multiple redundant channels having dissimilar software and hardware with respect to each other. An early example of the use of dissimilar redundancy is the space shuttle system, which uses five redundant computer channels with two dissimilar sets of software to overcome untested software errors or bugs that could lead to common cause system failure, while using three-out-of-five majority voting for masking transient faults. As such, the five computers maintained by the space shuttle are able to withstand any two permanent or transient failures, while still maintaining safe flight and operation. However, for industrial controls, the five computer redundant system requires use of additional input/output modules working with field sensors and actuators, which significantly increases the size and weight of the system, making it very expensive to implement.

Another redundancy technique which is used in an aircraft control system is referred to as a distributed central system (DCS), which is described in U.S. Pat. No. 6,860,452, whereby the controllers are split into first and second groups in a way that controllers of the first group have dissimilar software and hardware with respect to controllers of a second group for avoiding a common cause failure path. In this redundancy technique, flight control tasks are distributed among two or three controllers that belong to the different group, such that no single controller has exclusive control of the elevator, aileron, or the rudder. Furthermore, if the entire group of controllers fails and one controller in a neighboring group fails concurrently, the system still provides a pilot to manage flight control of the aircraft. As such, two-thirds of the system could fail and acceptable performance would still be achieved.

The deficiency of this type of distributed control system (DCS) is that the DCS does not provide sufficient protection against transient faults. For example, in U.S. Pat. No. 6,860, 452, each controller of the system implements a set of control tasks that are similar but not equivalent to tasks implemented by other controllers so that the controllers are not able to use a conventional majority voting technique for outvoting possible erroneous results of the control tasks. Since each system task is implemented by two or three controllers, the occurrence of two concurrent transient faults can lead to failure of the system if a pilot is not fast enough to make appropriate corrections. Another negative feature of the DCS control architecture with respect to its use in industrial controls is that the DCS is a specifically-built system for use in flight control. Industrial redundant and non-redundant control systems are mostly programmable logic controllers (PLC) that are universal devices that allow end-users to download control program into PLC memory to implement required control tasks. In comparison to the DCS control system that distributes control tasks among controllers, the redundant PLC usually deploys controllers which implement the same control tasks synchronously with the neighboring controllers. Furthermore, the user can change the control program if it is required for the controlled object.

Another flight control system, such as that disclosed in U.S. Pat. No. 4,622,667, utilizes identical subsystems each of which includes three processing elements providing dissimilar data processing with respect each to other by using dissimilar software and/or dissimilar hardware. Cross-channel monitoring is included in each subsystem to identify disagreements between the outputs of the processing elements. This procedure allows the systems to detect a faulty element that is then disabled. In particular, the considered system may include nine processing elements arranged into three subsystems to allow the subsystems to remain operational in the presence of two faults of any type with respect to the processing elements. The subsystem, however, also includes three logic elements and two switches for disabling the processing element in the event that it fails. Logic "AND" elements maintained in each subsystem provides an output signal that disengages aircraft actuator equipment when two processing elements concurrently fail. However, if two logic "AND" elements related to different subsystems fail, it can lead to system failure since aircraft actuator equipment cannot be disconnected from the source of power. Another serious drawback of the system is that it is relatively complex and expensive to utilize nine computing elements, while three types of dissimilar software further increases expenses needed to develop software for the system.

Continuing, U.S. Pat. No. 6,367,031 discloses a flight control system that utilizes multiple core processing modules (CPM), each of which is capable of computing and executing aircraft control commands. The CPM includes two central processor units (CPU) connected to each other for comparing computation results in the first layer of the comparison. A second layer comparison is arranged by using Boolean "AND" elements that compare the results generated by the second layer comparison. The CPM utilizes identical software and hardware but the multiple core processing modules (CPM) are physically and electrically isolated from each other in separate computing cabinets so as to reduce the probability of common cause failure. Each comparison function is configured to detect a difference in CPM processing results and to disable a faulty CPM without affect to neighboring CPM operations. In particular, the considered system which includes three CPMs remains operational in the event that any two CPMs fail concurrently. The system, however, can fail in the event that two Boolean "AND" comparison elements related to different CPMs fail at the same time. The system can also fail due to possible software design error since all CPM utilize the same or similar software.

U.S. Pat. No. 6,813,527 discloses a control system architecture that comprises computing units having multiple processing units that each operates as a separate partitioned processing unit. Specifically, the system collects input data from sensors of the controlled plant as closed-loop feedback signals via a sensor adapter. Next, the processing units then compute output signals, which are monitored by an actuator adapter. The actuator adaptor is a processing device that provides an interface between the computing units and the actuators. When the actuator adaptor senses that one of the processing units is not supplying signals that lay within certain tolerances, the actuator adaptor transmits a signal to the computing unit that initiates a rapid fault recovery cycle for that processing unit. The system utilizes the conventional technique that involves computing a "mid-value" for output signals of the processing units. This mid-value is then compared to each output signal from each of the processing units for detecting a faulty processing unit. To accomplish rapid recovery in the event that a transient memory fault is detected, the faulty processing unit retrieves the necessary control and logic variables from an additional non-volatile random access memory that is immune from electromagnetic transients and other disturbances, which can affect the integrity of the memory. If the actuator adaptor senses a permanent fault, then the appropriate processing unit may be shutdown or isolated by the actuator adaptor. As such, the considered system provides rapid recovery from transient memory faults for each processing unit. However, in the event that the actuator adaptor fails, it can lead to system failure since a faulty adaptor will likely transfer the wrong output signal to the associated actuator.

U.S. Pat. No. 7,328,235 discloses multiple processing methods for fault tolerant control systems (FCS), which includes a plurality of processor nodes operating synchronously. During operation, the FCS collects input data from a data source, such as the sensors, by an input-processing node, which performs calculations on the basis of input data, and outputs the calculation results as output data to an output-processing node, such as an actuator adaptor. Each processing node includes means that allow it to detect its own fault and to acquire input data and calculation results from at least one normally operating node to recover after a fault. This method is suitable primarily for detecting transient faults; however, if the processing node suffers a permanent fault, it can still fail in many cases since its normal operation cannot be restored. The processing node can also fail due to a transient fault if the self-diagnostic fails at the same time. Another drawback of the considered method is that the input and output processing nodes have no protection against transient and permanent faults, resulting in the failure of the FCS in the event that either the input or the output processing node fails, thus producing erroneous input/output data.

The hybrid triple redundant (HTR) computer system 3, as shown in FIG. 1 and as disclosed in U.S. Pat. No. 6,732,300, includes three identical central processor modules (CPM) 11A, 11B, 11C, an input module 7, and an output module 70. Each input/output (I/O) module houses three I/O circuits respectively, whereby each input circuit 9 on the input module 7 reads the field data and passes that data to its respective central processor module (CPM) 11 over I/O buses 13A, 13B, and 13C. Three central processor modules 11 operate in parallel as the members of a triad, while the system 3 performs control functions on a cyclical basis. The period of an operation cycle is the scan time, which is primarily composed of the time required for I/O polling and the time required to execute the application program. Serial links 29A, 29b, and 29C are used by the CPMs 11a-c to communicate with each neighboring CPM 11 in read-only mode. Once per scan, the central processors 11a-c are synchronized, while each reads the input data and the diagnostic status of its neighboring CPM 11 module.

The CPMs 11a-c calculates the middle value among three sets of analog input data if it operates with the analog input module 7. The CPMs 11a-c performs two-out-of-three (2-out-of-3) software majority voting of the digital input data when it is operating with the digital input module 7. These techniques allow the system to mask possible input transient faults that would otherwise propagate into the calculations. The CPM 11 then executes the application program and sends output data generated by this program to the output module 70.

Continuing, the output module 70 includes three identical microcontrollers 20a-c, each of which communicates with the associated central processor modules 11a-c over the corresponding buses 13a-c to receive output data from the associated CPMs 11a-c. The output module 70 further includes three identical output circuits 32a, 32b, and 32c, each of which includes a logic circuit 42 and an output voter network 54. Each output voter network 54a-c consists of multiple pairs of electronic valves 53a1-c1 and 55a1-c1 that are connected in series to each controlled point and provides to each point a corresponding output 59. The associated outputs 59 are connected together, providing a system output 65 for the corresponding load 67. Each valve 53, 55 is controlled by the associated microcontroller 20 via the corresponding logic circuit 42. Each output voter circuit 54 also includes current sensors 57a1-c1, each of which is connected in series with the associated pair of valves 53 and 55. The current sensors 57 generate feedback signals over lines 47 to inform the associated CPM 11 via the microcontroller 20 about the current flowing through the valves 53, 55. Each voter network 54 also includes a fault recovery valve 56 that is in a normally ON state, but it can be passed to an OFF state in the event that the associated voter network fails.

The first output circuit 42a is connected to the first microcontroller 20a and to the third microcontroller 20c for producing its output 59a as a logical product of the output data generated by the CPM 11a and the CPM 11c. A second output circuit 42b is connected to the second microcontroller 20b and to the first microcontroller 20a for producing its output 59b as a logical product of the output data generated by the CPM 11b and the CPM 11a. A third output circuit 42c is connected to the third microcontroller 20c and to the second microcontroller 20b for producing its output 59c as a logical product of the output data generated by the CPM 11c and CPM 11b. The outputs 59a, 59b, and 59c are connected together for generating the system output 65 as a logical sum of the outputs produced by the output circuits 42a, 42b, and 42c, thereby providing two-out-of-three voting among the output data produced by the CPM 11a, CPM 11b, and CPM 11c in normal system operation. Each output module 70 further includes three identical watchdog controllers (WDC) 31 that are configured to detect faults within the associated microcontrollers 20 and in the associated CPM 11. Each WDC 31 is separately connected to each output circuit 42 to activate an alarm signal on the input of each output circuit 42 in the event that the WDC 31 detects a fault within the associated microcontroller 20 or in the associated CPM 11. WDC 31a, WDC 31b, and WDC 31c activates alarm signal wa, wb, and we respectively.

During normal operation of the prior art system 3, shown in FIG. 1, the output module 70 provides the system output 65 as a result of two-out-of-three voting among output data produced by the three CPMs 11 if alarm signals are not activated. In the event that one CPM 11 or the associated microcontroller 20 fails, the system is reverting from two-out-of-three voting to two-out-of-two voting that is produced by output module 70 with output data that it received from two healthy CPMs 11. In the event that two CPMs concurrently fails the system is reverted from two-out-of-two voting to one-out-of-one voting that output module 70 performs using output data received from one CPM that is still healthy.

With respect to faults that may occur in valves 53 and 55, the voter network 54 still provides the correct output 59 in the presence of faulty valve 53 or valve 55 or both of them if those valves are stuck in the OFF state. The microcontroller 20 monitors the status of each associated valve 53 and 55 during each scan by reading feedback data produced by the associated current sensor 57. In the event that the valves 53 and 55 in series are stuck in the ON state, the microcontroller 20 asserts a signal on the line 35 that drives the associated fault recovery valve 56 to the OFF state. As a result, the outputs 59 of the faulty voter network 54 are disconnected from the system outputs 65 to avoid system failure.

The HTR system, therefore, remains operational in the presence of any two permanent system faults. It also may continue to operate properly in presence of certain kinds of three permanent faults. The system performs two-out-of-three voting that allows the system to remain operational upon the occurrence of a single transient fault, even though this fault was not detected. The HTR system also includes a comprehensive diagnostic of all system components, allowing the system to provide correct output upon the occurrences of two transient faults. When a transient fault is detected, the HTR system disables the faulty circuit or module and switches control of the output to components that are still operating properly. The HTR, therefore, automatically restores system configuration after the disappearance of the transient faults. The HTR system, however, is not protected enough against the common cause failure, as the HTR will fail in the event that all three central processor modules fail at the same time due to a common cause failure.

As presented above, current computer systems are not capable of allowing the system to remain operational upon the occurrence of multiple faults in their components. Therefore, there is a need for a multiple redundant computer system utilizing dissimilar redundancy to provide uninterrupted system operation in the presence of multiple permanent and/or transient faults, as well as in the presence of common cause faults in the system components.

SUMMARY OF THE INVENTION

An object of the present invention is to provide an improved multiple redundant computer system that is able to remain operational in the presence of multiple permanent and/or transient faults, including common cause faults in the system components. The system of the present invention is primarily designed to allow industrial control systems to provide a very high level of fault tolerance and safety, which is required for extremely critical control applications. It should also be appreciated that the system can be implemented in various embodiments and adapted for car control, aircraft control, and space vehicle control, as well as many other responsible control applications. While the present invention has been primarily described as operating with digital inputs, it should be understood that the system may also operate with analog inputs as well.

In view of this object, the multiple redundant computer system of present invention generally includes a first, a second and a third primary processor module operating in parallel on a cyclical basis. The system also includes a first, a second and a third redundant processor module that also operate cyclically in parallel. The first, second, and third primary processor modules are respectively connected to associated first, second, and third primary input circuits to receive input data therefrom and to use this data as input for a control program that is executed by each primary processor module. The first, second, and third redundant processor modules, respectively, are connected to the associated first, second, and third redundant input circuits to receive input data therefrom and to use this data as input for a control program that is executed by each redundant processor module. The system further includes an output module comprising a first, a second, and a third output circuit. Each output circuit houses a first and a second interface for receiving output data from the primary and redundant processor modules, respectively. The primary processor module (PPM) is connected to the associated redundant processor module (RPM) for sending a command to the RPM in order to initiate execution of the control program at the same time that the PPM begins execution of its control program. The PPM and RPM, therefore, synchronously execute the control program. The PPM executes the control program during each cycle of operation and then transfers output data as a result of control program execution to a first interface of the associated output circuit. The RPM executes the control program during each cycle of operation and then transfers output data as a result of control program execution to a second interface of the associated output circuit. The output circuit, therefore, receives output data from associated primary and redundant processor modules close in time during each cycle of system operation. Outputs of first, second and third output circuits for each controlled point connected together for providing system output for the corresponding point. First, second; and third output circuit communicates each to others during each cycle of system operation for receiving output data of neighbors. Thus, during normal system operation, each output circuit calculates a logical sum of output data that it received from neighboring output circuits. The output circuit then produces its output as a logical product of its own output data and the aforementioned logical sum. Outputs from the first, second, and third output circuits are connected together to provide system output as a logical sum of output data generated by said output circuits. As such, the system produces system outputs for each controlled point as a result of two-out-of-three majority voting among the output data produced by the first, second, and third primary processor modules.

In normal system operation each output circuit uses output data received from associated primary processor module and output module produces system output as the result of two-out-of three voting among output data generated by first, second and third primary processor module. In the event, however, that the primary processor fails due to a permanent fault the output circuit recognizes it and uses output data received from the redundant processor module. The output module, therefore, produces system output as the result of two-out-of three voting among output data generated by first, second and third redundant processor module in the event that first, second, and third primary processor module concurrently fails. In general the output module is capable to produce system output as the result of two-out-of-three voting among output data generated by three processor modules, in any combination including primary and redundant processor modules if each output circuit receives output data from the associated primary processor module or from the associated redundant processor module. The system, therefore, in many cases continues to provide two-out-of three voting for output data even though three processor modules out of six concurrently fail due to permanent faults.

In the event that four processors modules fail, the output module will produce the system output as the result of two-out-of-two voting among output data generated by two processor modules in any combination including primary and redundant processor modules if any two output circuits out of three will receive output data from primary processor module or from redundant processor module. In the case when five processor modules fail, the output module will produce the system output as the result of one-out-of-one voting with output data generated by the primary processor module that has not failed, or with output data generated by the redundant processor module if primary processor module fails. The output module provides system output go to a safe condition in the event that all primary and redundant processor modules concurrently fail. The system, therefore, provides very high level of fault tolerance with respect to permanent faults, as it remains operational if at least one processor modules out of six still to properly operate.

The system of the present invention also presents a comparison mode and a hot spare mode to provide protection against transient faults. Computer systems devoted for safe and critical control applications usually deploy self and mutual diagnostic in redundant processing units for transient fault detecting and recovering. These diagnostics allows the system to detect many kinds of transient faults but cannot provide 100% faults coverage, as well as guarantee the system to provide more than single fault tolerance even with respect to detected transient faults. The system of the present invention in both comparison and hot spare mode deploys conventional diagnostic means together with new techniques that guaranties the system to operate properly in the presence of up two and even more transient faults.

The comparison mode and hot spare mode utilize the same hardware but differ in their method of detecting and recovering from transient faults. In the comparison mode (claims 1-11), each output circuit compares output data received from the associated primary and redundant processor modules to identify whether a possible disparity exists among the output data for each controlled point. During normal system operation, output data produced by the associated primary processor module (PPM) and redundant processor module (RPM) are equal, and the output circuit uses output data received from the PPM. If disparity between said output data is discovered by the output circuit it does mean that the PPM or associated RPM produces erroneous data due to transient fault. In the event that disparity is discovered, the output circuit disables own output data for controlled points where disparity has been identified. The output circuit then produces its output as a logical sum of output data received from two neighboring output circuits, thereby providing system output as a result of two-out-of-two voting among output data that said neighboring circuits received from associated primary processor modules.

In general, the system output in the comparison mode is generated by the following means:

means in first, second, and third output circuits for generating system output as a result of two-out-of-three voting among output data that first, second and third output circuits receives from first, second and third primary processor modules for each controlled point in which aforementioned disparity is not discovered;

means in first, second, and third output circuits for generating system output as a result of two-out-of-two voting among output data that said output circuits receives from first and second primary processor modules for controlled points where disparity between output data that the third output circuit receives from third primary and third redundant processor module is discovered;

means in said first, second, and third output circuits for generating system output as a result of two-out-of-two voting among output data that said output circuits receives from first and third primary processor modules for controlled points where disparity between output data that the second output circuit receives from second primary and second redundant processor module is discovered;

means in said first, second, and third output circuits for generating system output as a result of two-out-of-two voting among output data that said output circuits receives from second and third primary processor modules for controlled points where disparity between output data that the first output circuit receives from first primary and first redundant processor module is discovered;

means in said first, second, and third output circuits for generating system output as a result of one-out-of-one voting with output data that said output circuits receives from first primary processor module for controlled points where disparity between output data that second and third output circuit receives from associated primary and redundant processor module is discovered;

means in said first, second, and third output circuits for generating system output as a result of one-out-of-one voting with output data that said output circuits receives from second primary processor module for controlled points where disparity between output data that first and third output circuit receives from associated primary and redundant processor module is discovered;

means in said first, second, and third output circuits for generating system output as a result of one-out-of-one voting with output data that said output circuits receives from third primary processor module for controlled points where disparity between output data that first and second output circuit receives from associated primary and redundant processor module is discovered;

means in said first, second, and third output circuits for driving the system output to a safe condition for controlled points where disparity between output data that each output circuit receives from associated primary and redundant processor module is discovered;

The output module of the system of present invention is also very well protected against both permanent and transients faults. First, second and third output circuit of the output module respectively including a first, a second, and a third logic circuit each of which is connected to the associated primary processor module over first interface and connected to the associated redundant processor module over second interface for receiving output data from said processor modules. The logic circuit provides a first and a second output per each controlled point. In normal system operation each logic circuit receives output data from the associated primary processor module and receives output data from neighboring output circuits. Each logic circuit, therefore, receives output data generated first, second and third primary processor module. The logic circuit asserts output data received from primary processor module on first output and asserts a logical sum of output data received from neighboring logic circuits on second output.

First, second, and third output circuits further including a first, a second, and a third voter network respectively. Each voter network is connected to first and second outputs of the associated logic circuit. Output of the voter network is produced as a logical product of output data asserted on first and second outputs of the associated logic circuit. Output of the voter network, therefore, is a logical product of output data that the associated logic circuit received from associated primary processor module and a logical sum of output data that neighboring logic circuits received from their associated primary processor modules. Outputs of the first, second, and third voter networks are connected together for providing the system output as a logical sum of output data that produce outputs of said first, second, and third voter networks, thereby providing the system output to be a result of two-out-of-three voting among output data generated by the first, second, and third primary processor modules.

During each cycle of operation the logic circuit sets an internal watchdog for predetermined period of time and then waiting output data from the associated primary processor module. In the event that primary processor module failed to deliver output data before watchdog time expired, the logic circuit uses output data delivered by associated redundant processor module. In the case when both primary and redundant processor modules fail then the associated logic circuit transfers a logical '0' output data to neighboring output circuits and asserts output data on own first and second output as a logical sum of output data received from neighboring output circuits. These actions provide the output module to reconfigure from two-out-of-three (2-of-3) voting to two-out-of-two voting (2-of-2) in the event that primary and redundant processors associated with the same logic circuit concurrently fails. In the event that any two logic circuits discovered that their associated primary and redundant processor modules concurrently fail, the output module is reconfigured from 2-of-3 voting to one-out-of-one (1-of-1) voting with output data generated by the primary processor module that has not failed.

Each logic circuit is also connected to the associated voter network for detecting possible voter network faults and for activating an emergency signal that disables outputs of the voter network in the event that more than two components of voter network concurrently fail. The output module continues to provide 2-of-3 voting among output data produced by three primary processor modules in the presence of up two faults in the voter network. The output module is reconfigured from 2-of-3 voting among output data produced by three primary processor modules to 2-of-2 and 1-of-1 vote in the presence of one and two faulty voter networks respectively. An additional watchdog timer in each output circuit is used for detecting the occurrence of a fault in the associated logic circuit and for activating an alarm signal that disables outputs of the logic circuit in the event that the said logic circuit fails. The output module is reconfigured from 2-of-3 voting among output data produced by three primary processor modules to 2-of-2 and 1-of-1 vote in the presence of one and two faulty logic circuits respectively. In the preferable embodiments of the system of present invention each logic circuit is implemented as Application Specific Integrated Circuit (ASIC) that utilizes two-out-of three hardware voting configuration allowing the ASIC has no single point of failure. Hence, the output module is still able to provide two-out-of-three voting with output data produced by three primary processor modules in the presence of a single fault in each ASIC. The ASIC is a hardware based device that is much less susceptible to common cause faults than microprocessors, which are used by prior art output modules. Hence, the ASIC significantly decreases the susceptibility of the output modules to a common cause failure. The output module of the invention, therefore, provides much higher level of fault tolerance than the output module presented in the prior of art shown in FIG. 1. The output module of the invention guaranties to be operational in the presence of any two faults and may to operate properly in a face of certain kind of three faults. As an option, the hot spare output circuit or hot spare output module can be provided for online repairing a faulty output circuit or faulty output module respectively for further increasing system fault tolerance and availability.

The hot spare mode (claims 11-22) is similar to the comparison mode of system operation in the presence of permanent faults. The hot spare mode, however, is different to the comparison mode with respect to system operation in the occurrence of transient faults. In the hot spare mode the primary processor module in each cycle of operation compares its output data with output data produced by two neighboring primary processor modules and sets a disparity flag for controlled points where disparity in the output data is discovered. Another difference between the hot spare and the comparison mode is that the redundant processor modules (RPM) in the hot spare mode perform two-out-of-three voting among their input data and each RPM uses a result of two-out-of-three voting as input for the control program. This technique allows the redundant processor modules to decrease the probability of producing incorrect output data by masking possible transient faults that would otherwise propagate into the calculation of RPM output data. The probability of system failure is in turn significantly decreased, since the output module will receive the correct output data until one PPM and two RPMs concurrently fail due to the occurrence of transient faults. During operation of the system in the hot spare mode, each primary processor module communicates with a neighboring primary processor module to compare its output data per controlled point with output data produced by two neighboring primary processor modules. If the output data produced by the primary processor modules are equal for each controlled point, then each primary processor module (PPM) does not set a disparity flag for those controlled points. In the event that a disparity among the output data is discovered, the PPM sets a disparity flag for the controlled points where the disparity is discovered. The PPM then transfers output data and the associated disparity flags to the associated output circuit. The output circuit checks the disparity flag, and uses output data received from the primary processor module (PPM) for controlled points where the disparity flag is not set and uses output data received from the redundant processor module (RPM) for controlled points where the disparity flag is set. In normal system operation, the disparity flag is reset for each controlled point so that the output module produces system output per controlled point as the result of two-out-of-three voting among output data received from the three primary processor modules. However, for controlled points where the disparity flag is set, the system output is produced as the result of two-out-of-three voting among output data received from the certain combination of primary and redundant processor modules.

In the event that first output circuit defines that the disparity flag is set, the first output circuit then uses the data produced by the first RPM. In this case, the output module will produce a system output as the result of two-out-of-three voting among the output data generated by the first RPM, the second PPM, and the third PPM for controlled points where the disparity flag is set. In the event that the second output circuit defines that the disparity flag is set, the second output circuit uses data produced by the second RPM. In this case, the output module will produce system output as the result of two-out-of-three voting among output data generated by the first PPM, the second RPM, and the third PPM for controlled points where the disparity flag is set. In the event that a third output circuit determines that the disparity flag is set, the third output circuit uses data produced by the third RPM. In this case, the output module will produce a system output as the result of two-out-of-three voting among the output data generated by the first PPM, the second PPM, and the third RPM for controlled points where the disparity flag is set. The output module, however, will still provide the system output as the result of two-out-of-three voting among the output data received from the three primary processor modules for controlled points where the disparity flag is reset.

In the event that the first and the second output circuits define that the disparity flag is set, they will respectively use the output data produced by the first RPM and the second RPM. The output module will produce system output as the result of two-out-of-three voting among the output data generated by the first RPM, the second RPM, and the third PPM for controlled points where the disparity flag is set. In the event that the first and the third output circuits define that disparity flag is set, they will respectively use output data produced by the first RPM and the third RPM. The output module will produce a system output per controlled point as the result of two-out-of-three voting among output data generated by the first RPM, the second PPM, and the third RPM for controlled points where the disparity flag is set. In the event that the second and the third output circuits define that the disparity flag is set, they will respectively use the output data produced by the second RPM and the third RPM. The output module will produce system output as the result of two-out-of-three voting among output data generated by the first PPM, the second RPM, and the third RPM for controlled points where disparity flag is set. In the event that the first, second, and third output circuits define that the disparity flag is set, they will respectively use the output data produced by the first RPM, the second RPM, and the third RPM. The output module will produce system output per controlled point as the result of two-out-of-three voting among output data generated by the first, second, and third RPM for controlled points where the disparity flag is set.

The system in hot spare mode, therefore, continues to provide two-out-of-three voting among the output data in the presence of multiple transient faults occurring in the primary (PPM) and redundant (RPM) processor modules, as well in the primary and redundant input modules. For instance, the system continues to operate properly in presence of three transient faults when two PPMs and one RPM have concurrently failed. The hot spare method, therefore, provides higher level fault tolerance than comparison mode provides with respect to transient faults. A slight disadvantage of hot-spare approach is that the system will not be able to immediately provide safe condition of controlled process in the case where three PPMs produce equal but incorrect output data for the same controlled point due to concurrent transient faults.

In addition, the multiple redundant computer system of the present invention in both the comparison and hot spare modes provides protection against common cause failure. In one aspect regarding to hardware and software, the system includes three primary processor modules that are identical to each other and includes three redundant processor modules that are also identical to each other. The primary processor module PPM and the redundant processor module RPM, however, are different in hardware and software with respect each to other, allowing the system to avoid a common cause failure caused by software design errors or hardware faults. For example, in the event three primary processor modules (PPM) concurrently fail due to common cause stress, such as a software error, the system will remain operational using the three redundant processor modules.

The primary and redundant modules in the redundant computer system of the present invention can be located in different cabinets to further decrease the probability of a common cause failure that could otherwise occur if a stress event, such as lightning or cosmic radiation is greater than the strength of components in both the primary and the redundant parts. In accordance with this approach the primary input module, the first, second and third primary processor modules and the output module are located in a first cabinet, while the redundant input module and the first, second, and third redundant processor modules are located in a second cabinet.

In accordance with another approach, the multiple redundant computer system of the present invention allows loading a primary control program and redundant control program to each primary processor module (PPM) and allows the primary processor module to reloading a redundant control program to the redundant processor module (RPM). Primary and redundant control programs are used to carry out the same control tasks but differ in their software code and associated compilers since the primary and redundant processor modules differ in their hardware and employ different types of processing elements. As such, it is beneficial to develop a primary control program for a certain application by one team of programmers and to develop a redundant control program for the same application by another team of programmers to avoid common errors within of these programs during development. This approach allows the system to significantly decrease the probability of a common cause failure. Furthermore, the primary and redundant control programs can be respectively downloaded into the memory of the primary and the redundant processor modules via conventional computer software developing means and/or conventional data transfer techniques. Some applications, however, require that the system be able to modify the control program by the operator when his or her intervention in the controlled process is required. For those applications the system in one embodiment presents a method that allows the user to load modified primary and redundant control programs into the primary processor module PPM and enable the PPM to on-line reload redundant control programs into the associated redundant processor module RPM. The PPM then sends a command to the associated RPM to initiate redundant control program execution synchronously with primary control program execution of the PPM.

In an alternative embodiment of the system, the first, second and third redundant processor modules are implemented as a single-chip redundant processor unit (RPU). This alternative embodiment provides a more compact implementation of the redundant processor modules, thus decreasing system complexity. The redundant processor unit (RPU) is assembled in a triple modular redundant (TMR) configuration to allow the RPU to have no single point of failure. The RPU is also radiation hardened to decrease the probability of RPU failure due to cosmic radiation. For instance, radiation hardened SPARC V8 processors produced by ATMEL Corp. are suitable for use as an RPU in hot spare mode operation, as this processor utilizes the triple modular redundant configuration that enables the RPU to not have a single point of failure.

The RPU can be on-line removed in the event that the RPU fails and then on-line replaced by an operative RPU without interrupting of system operation. This embodiment of the present invention provides system remain operational in the presence of up to two transient faults. With respect to permanent faults, the present embodiment continues to operate properly in the event that three primary processors concurrently fail or when the redundant processor unit and the two primary processor modules concurrently fail. As such, the system tolerates up to three permanent faults.

BRIEF DESCRIPTION OF THE DRAWINGS

These and other features and advantages of the present invention will become better understood with regard to the following description, appended claims, and accompanying drawings wherein:

DETAILED DESCRIPTION OF THE PREFERRED EMBODIMENTS 1.0 General System Operation

Figure 2A:
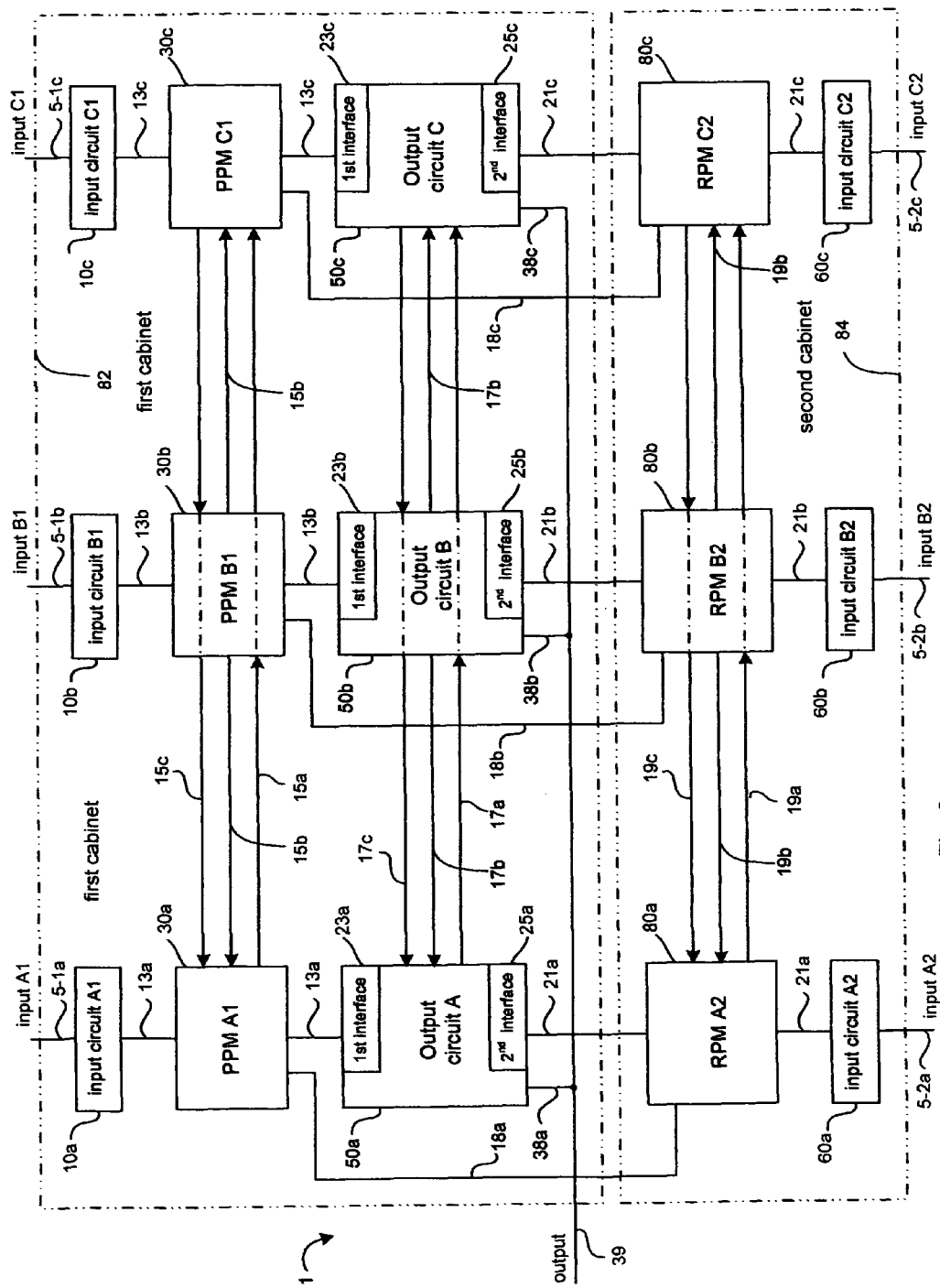
FIG. 2a is a block diagram of a multiple redundant computer system utilizing dissimilar redundancy technology in accordance with the concepts of the present invention.

A multiple redundant computer system utilizing dissimilar redundancy technology is generally referred to by the numeral 1, as shown in FIG. 2a of the drawings. The system 1 includes primary processor modules (PPM) 30a, 30b, and 30c and associated redundant processor modules (RPM) 80a, 80b, and 80c. The PPMs 30a-c receive input data from respective associated primary input circuits 10a, 10b, and 10c, while the RPMs 80a-c receive input data from respective associated redundant input circuits 60a, 60b, and 60c. In one aspect, the primary input circuits 10a-c may be assembled as a single primary input module (not shown), and the redundant input circuits 60a-c can be assembled as a single redundant input module, as well. The system also includes output circuits 50a, 50b, and 50c that are associated with each respective PPM 30a-c and RPM 80a-c. In one aspect, the output circuits 50a-b may be assembled or formed as a single output module (not shown). The input circuits 10a, 10b, and 10c are connected to an associated primary field sensor for each controlled point (not shown) via lines 5-1a, 5-1b, and 5-1c for reading process data and converting it to input data for the associated primary processor module 30. Three primary field sensors (not shown) in redundant configuration are located at the same controlled point of the controlled process.

During operation of the system 1, the first primary input circuit 10a reads process data over line 5-1a and sends input data to the first primary processor module 30a (PPM1). The primary processor module 30a receives input data from the input circuit 10a via I/O bus 13a and uses that data as input to the control program. The primary processor module 30a then executes the control program and transfers the output data to the first output circuit 50a over interface 23a. The second primary input circuit 10b reads process data over line 5-1b and sends input data to the second primary processor module 30b (PPM2). The primary processor module 30b receives input data from the input circuit 10b via I/O bus 13b and uses that data as input to the control program. The primary processor module 30b then executes the control program and transfers output data to the second output circuit 50b over interface 23b. The third primary input circuit 10a reads process data over line 5-1c and sends input data to third primary processor module 30c (PPM 3). The primary processor module 30c receives input data from input circuit 10c via I/O bus 13c and uses that data as input to the control program. The primary processor module 30c then executes the control program and transfers output data to third output circuit 50c over interface 23c.

Continuing, the system 1 performs control functions on a cyclical basis, whereby the operation cycle period of system 1 is defined by the scan time, which is primarily composed of the time required for input data polling, control program execution, and the time required by the PPM 30 to transfer output data to the output circuit 50 via bus 13. In addition, the primary processor modules (PPM) 30a-c operate in parallel as the members of a triad. And during each scan of an operating cycle, each PPM 30 performs a self-diagnostic and a diagnostic of the neighboring PPMs 30a-c to detect possible faults and to disable any faulty PPM 30 output upon the occurrence of a fault. The primary processor module (PPM) 30a-c utilizes a bus 15a-c for transmitting its own status and I/O data to neighboring PPMs 30a-c a few times per scan to synchronize with neighboring PPMs 30. The PPM 30 receives input data from the associated input circuit 10 and executes a control program for producing output data. Then the PPM 30 communicates with neighboring PPMs 30 in order to synchronously send output data to the associated output circuit 50 via interface 23 at the same time. The output circuit 50 receives output data and utilizes serial links 17a-c for transmitting its own status and output data to neighboring output circuits 50a-c to synchronize them as the output circuits 50 perform their operations synchronously on a cyclical basis.

The redundant input circuits 60a, 60b, and 60c are connected to the associated redundant field sensor (not shown) for each input via lines 5-2a, 5-2b, and 5-2c to read process data and to convert it to input data for the associated redundant processor module 80. The primary and redundant field sensors (not shown) for the same input are located at the same controlled-point of the process to monitor a particular state or condition of the process being controlled. The first redundant input circuit 60a reads process data over line 5-2a and sends input data to the first redundant processor module 80a (RPM 1). The redundant processor module 80a receives input data from input circuit 60a via I/O bus 21a and uses that data as input to the control program. The redundant processor module 80a then executes the control program and transfers output data to the first output circuit 50a over interface 25a. The second redundant input circuit 60b reads process data over line 5-2b and sends input data to the second redundant processor module 80b (RPM 2). The redundant processor module 80b receives input data from the input circuit 60b via I/O bus 21b and uses that data as input to the control program. The redundant processor module 30b then executes the control program and transfers output data to the second output circuit 50b over the interface 25b. The third redundant input circuit 60a reads process data over line 5-2c and sends input data to the third redundant processor module 80c (RPM 3). The redundant processor module 80c receives input data from the input circuit 60c via I/O bus 21c and uses that data as input to the control program. The redundant processor module 80c then executes control program and transfers output data to the third output circuit 50c over the interface 25c.

The redundant processor modules (RPM) 80a-c performs control functions on a cyclical basis and operates in parallel as the members of a triad, such that during each scan the RPM 80 performs a self-diagnostic and a diagnostic of neighboring RPMs 80a-c to detect possible faults and to disable faulty RPM 80 outputs upon the occurrence of a fault. The redundant processor module (RPM) 80 utilizes a bus 19a-c for transmitting its own status and I/O data to neighboring RPMs 80a-c a few times per scan for synchronizing with neighboring RPMs 80. The RPM 80 receives input data from the associated input circuit 60, executes a control program, and then transfers output data to a second interface 25a-c of the associated output circuit 50 over a bus 21a-c.

Primary processor modules 30a, 30b, and 30c are identical in software and hardware with respect to each other, while redundant processor modules 80a, 80b, and 80c are also identical in software and hardware with respect to each other. However, the primary processor modules 30a-c and the redundant processor modules 80a-c differ in hardware and software to decrease the probability of a common cause failure, which may affect all three PPMs 30a-c or all three RPMs 80a-c at the same time.

To provide uninterrupted system operation, the multiple redundant computer system 1 provides a comparison mode and a hot spare mode which utilize different techniques to protect the system 1 against transient faults. The system 1 utilizes the same hardware for both the comparison mode and the hot spare mode approaches, but differs in the particular method of decreasing affect of transient faults on system operation. Furthermore, it should be appreciated that the system 1 operates in the same manner in the comparison mode and hot spare mode with respect to the occurrence of permanent faults.

Figure 2B:
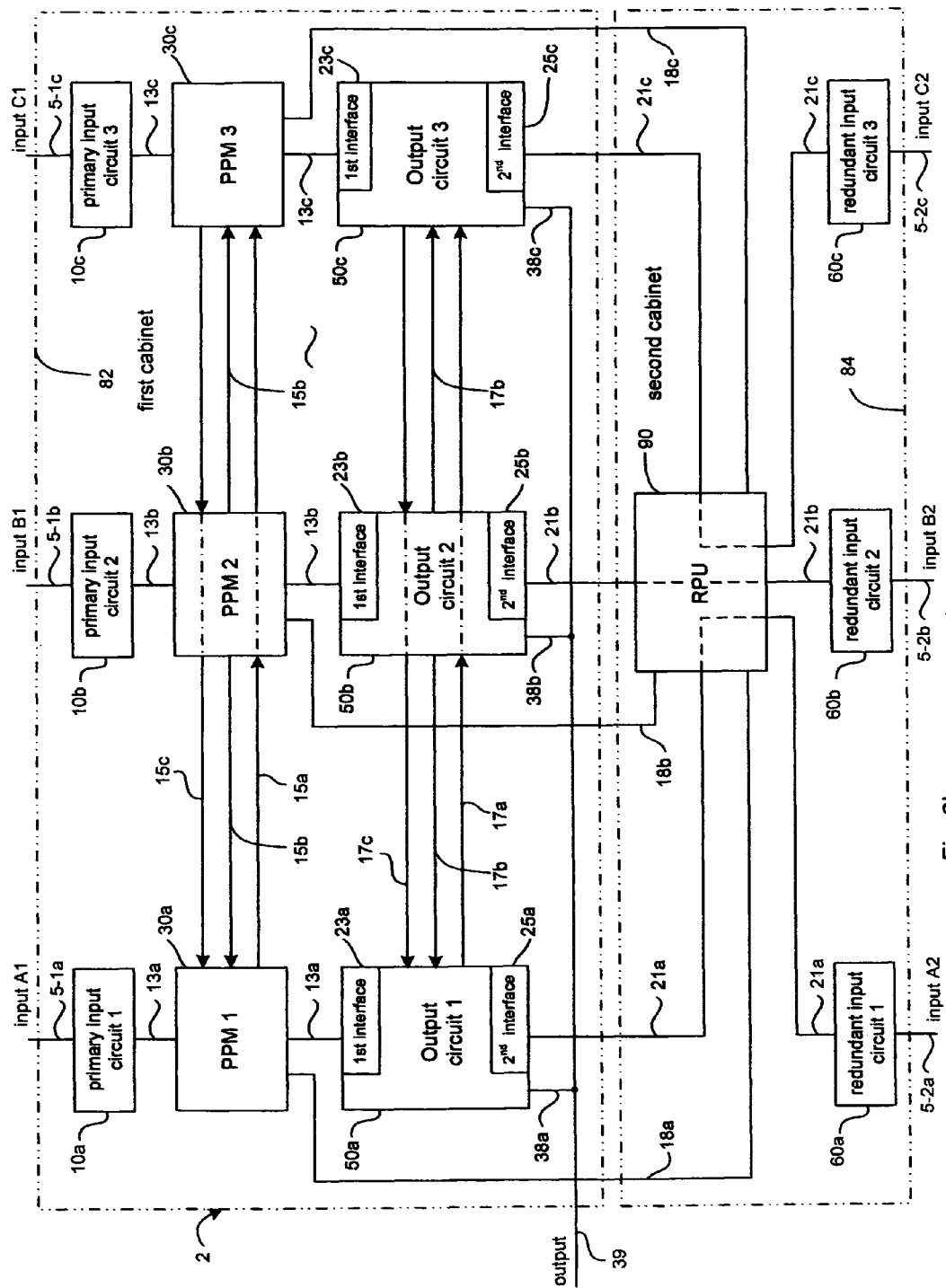
FIG. 2b is a block diagram of an alternative embodiment of a multiple redundant computer system utilizing dissimilar redundancy technology in accordance with the concepts of the present invention.

Continuing to FIG. 2b, an alternative embodiment of the multiple redundant computer system is referred to by the reference numeral 2, whereby the first, second, and third redundant processor modules (RPM) of the system 1 are implemented as a single-chip redundant processor unit (RPU) 90. The configuration of system 2 allows significantly decrease its cost and complexity. In one aspect, for increasing reliability the redundant processor unit 90 may be assembled in TMR configuration, allowing the RPU 90 to have no single point of failure. The RPU 90 may also be radiation hardened and protected against electromagnetic interference, further increasing fault tolerance. Additionally, the RPU 90 may be on-line removed in the event that it fails and then on-line replaced with an operational RPU 90 without interruption of system operation.

Returning now to the discussion of system 1 shown in FIG. 2a, the primary processor module (PPM) 30 uses a bus 18a-c to communicate with the associated redundant processor module (RPM) 80. Prior to the execution of the control program during each scan, each PPM 30a-c sends a command to associated RPMs 80a-c, respectively, via bus 18a-c to initiate execution of the control program at the RPMs 80a-c, as well, thereby allowing the associated PPM 30 and RPM 80 to execute the control program synchronously. For the purpose of the following discussion, it should be appreciated that the system 1 utilizes the same control program for the primary processor module 30 and the redundant processor module 80. In this case, the control program may include a configuration table consisting of a set of instructions that define the sequence of control functions for execution in accordance with the user's orders for each controlled point. Additionally, the control program also includes process parameters, such as gain, set-point, integral time, and derivative time per controlled point, for enabling operation of the proportional-integral-derivative (PID) control. The primary processor modules 30 and the redundant processor modules 80 execute control functions in the sequence ordered by the aforementioned configuration table. The primary processor modules 30 and redundant processor modules 80, however, differ in their hardware and software, and, as such, they operate with different code for each control function. Such diversity allows the system 1 to significantly decrease the probability of common cause software or hardware failures. With respect to the exemplary embodiment, we will also consider that system 1 allows the user to on-line load the control program to the primary processor module (PPM).

Figure 3:
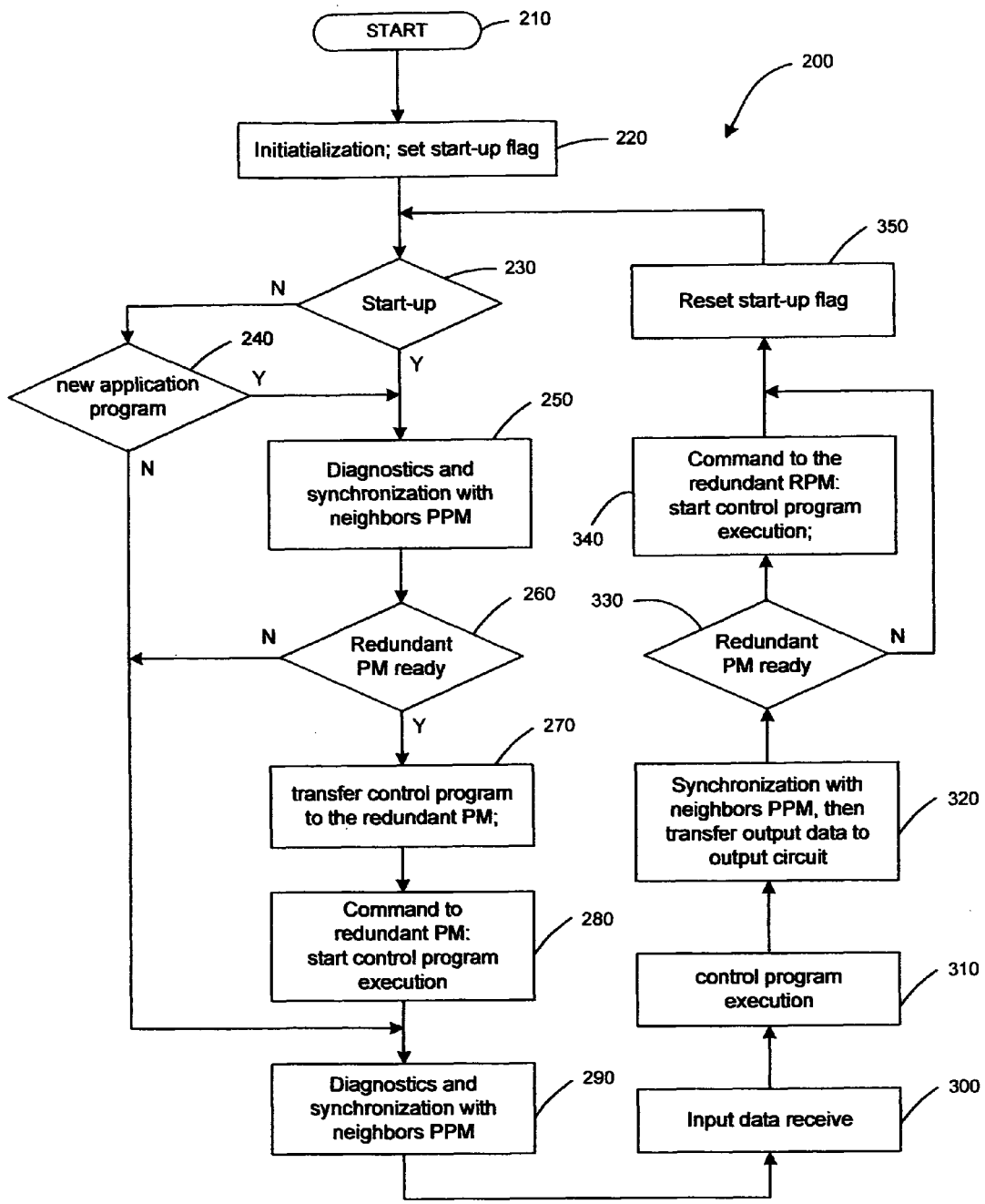
FIG. 3 is a flow chart of the operation of a primary processor module in accordance with the concepts of the present invention.

Referring now to FIG. 3, the operational steps employed by the primary PPM 30 to carry out the functions of the present invention are referred to by the reference numeral 200. Initially at step 210, the PPM 30 is powered up before continuing to step 220 where the PPM 30 is initialized prior to carrying out a conventional start-up diagnostic of its components and setting a start-up flag. Start-up flag is setting once for allowing the PPM 30 to load the control program to the associated RPM 80 in the first cycle of PPM 30 operation. Next, the process continues to step 230, where the PPM 30 checks if start-up flag set. If start-up flag is set, the process 200 continues to step 250, where each PPM 30a-c sends its status to neighboring PPMs 30a-c via the read-only serial communications bus 15. If start-up flag is not set, the process 200 continues to step 240, where the process determines if a new control program is loaded. During the communication at step 250, PPMs 30a-c are synchronized and implement self and mutual diagnostics. Next, at step 260, the PPM 30 then checks the READY signal that the associated redundant processor module (RPM) 80 shall activate at this time on a line of the bus 18. If the RPM 80 is ready, the process 200 continues to step 270, where the PPM 30 transfers control program to the associated RPM 80 over the bus 18. Next, at step 280, the PPM 30 commands the associated RPM 80 to start control program execution by sending a corresponding message to that RPM over bus 18. Step 280 allows PPM 30 and RPM 80 to begin the execution of their control programs at nearly simultaneously. After the completion of step 280, the process continues to step 290, where each PPM 30a-c sends its status to neighboring PPMs 30a-c via the read-only serial communications bus 15. During the communication, PPMs 30a-c are synchronized and implement self and mutual diagnostics. After step 290, the PPM 30 receives input data from the associated input circuit 10 at step 300 and executes the control program at step 310. Next, the process 200 continues to step 320, where the PPM 30 communicates with neighboring PPMs to synchronize with each other so as to enable each PPM 30 to send output data to the associated output circuit 50 at the same time. The process 200 then continues to step 330, where the PPM 30 rechecks the READY signal that the RPM 80 shall activate after completion the control program. At step 330 if the RPM 80 is not ready due its fault or absence, the process 200 continues to step 350, where the PPM 30 resets the start-up flag and the PPM 30 begins their next cycle of operation If the RPM 80 is ready at step 330, the process 200 continues to step 340, where the PPM 30 commands the associated RPM 80 to start control program execution by sending a corresponding message to that RPM over bus 18. Step 340 allows PPM 30 and RPM 80 to begin the execution of control program in each cycle of operation nearly close in time. After step 340, PPM 30 resets start-up flag and PPM 30 and RPM 80 begins their next cycle of operation at the same time. The process 200 then rechecks start-up flag at step 230 and continues to step 240 since start-up flag is reset.

Furthermore, it should be appreciated that the process 200 continues to step 290 from step 240 when the new application program has not being loaded to the PPM 30. The process 200 goes from step 240 to step 250 if new application program has being loaded. In this case the PPM 30 transfers that application program to RPM 80 at step 270 and commands the associated RPM 80 to start control program execution at step 280. If the RPM 80 fails to activate the READY signal within the predetermined time interval, then the PPM 30 starts control program execution without communications with the faulty RPM 80, as it is shown in FIG. 3. This allows each primary PPM 30 to continue to operate properly even though all three redundant RPMs 80 concurrently fail. In the case when a new control program has been online downloaded by the user into memory of the PPM 30 then the PPM 30 recognizes that and transfers the control program to the associated RPM 80 as it is shown in FIG. 3.

Figure 4:
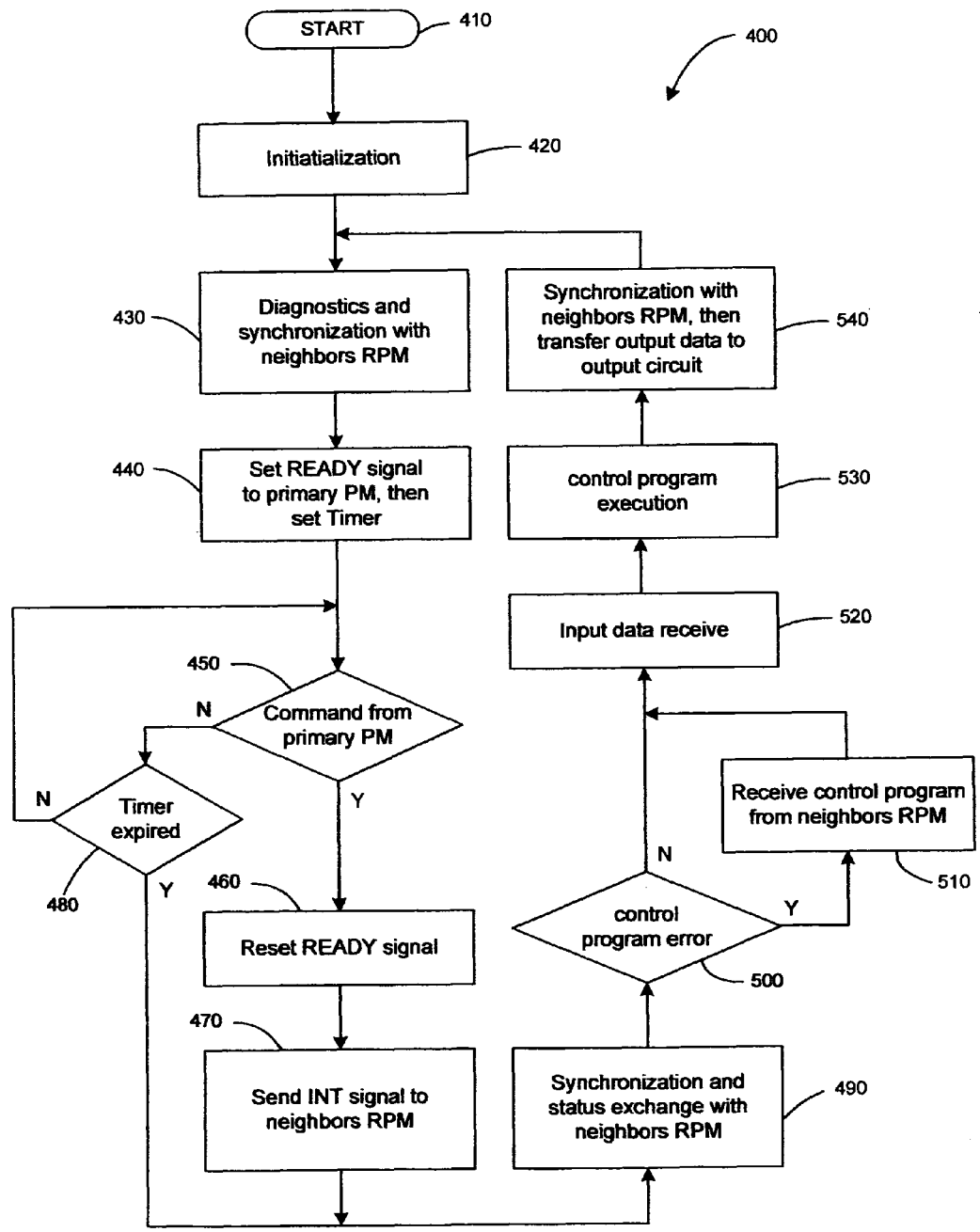
FIG. 4 is a flow chart of the operation of a redundant processor module in accordance with the concepts of the present invention.

Continuing, the steps taken by the redundant RPMs 80 during the operation of the multiple redundant computer system 1 are generally referred to by the reference numeral 400, FIG. 4. Initially, after the process 400 is started at step 410, the RPM 80 is initialized at step 420. Once initialized, the process 400 continues to step 430, whereby the RPM 80 implements a start-up diagnostic, and sends its status to neighboring RPMs 80 via the read only serial communications links 19. That is, during the communication the RPMs 80a-c are synchronized and carry out a self and mutual diagnostic function. Thus, this diagnostic, together with the conventional fault recovery means, allows the system 1 to prevent a faulty RPM 80 from sending output data to the associated output circuit 50. Next, at step 440, the RPM 80 sets a timer for a predetermined time period and then activates a READY signal for the associated PPM 30 on the corresponding line of the bus 18, as indicated at step 440. Next, at step 450, the RPM 80 waits to receive a message from the associated PPM 30, which comprises a command to initiate the execution of the control program and which may also include a new control program for the RPM 80 as well. When the command to initiate program execution is received from the PPM 30, the RPM 80 and resets READY signal at step 460 and activates an interrupt (INT) signal at step 470 that initiates communication among RPMs 80*a-c*. During the communication, the RPMs 80 are synchronized, and each RPM 80 sends its own status to neighboring RPMs 80 via step 490. However, if the message from the PPM 30 is not received by the RPM 80 before its timer has expired, as indicated at step 480, it is likely that the associated PPM 30 has failed. In such event, the process continues to step 490, however, the RPM 80 continues to operate properly by execution existing redundant control program synchronously with neighboring RPM 80 even though all three PPMs 30 have failed.

The PPM 30 applies the cyclic redundancy check CRC code to the control program for providing detection and correction of faults that may occur during PPM 30 and RPM 80 communications. RPM 80 utilizes a conventional decoding method for detecting and correcting possible faults occurred in the control program that RPM 80 has received from the PPM 30. At step 500, if some faults in the control program are discovered, the process continues to step 510, where the RPM 80 receives the control program from the neighboring RPMs 80. In the event that each RPM 80 receives a faulty control program, each RPM 80 responds by sending a demand message to the associated PPM 30 over bus 18 to initiate a resending of the control program. The PPM 30, in response will resend the control program in next step of its operation.

Next, after the input data has been received by the RPM 80 at step 520, the RPM 80 begins execution of the control program at step 530. As it was shown in FIG. 3, the PPM 30 receives input data and starts control program execution at step 530 close in time to when RPM 80 begins execution. Since the primary processor module 30 and the redundant processor module 80 differ in hardware and software, they may complete the control program and transfer output data to the associated output circuit 50 at different moments of time, while still allowing the output circuit 50 to receive output data from the associated PPM 30 and RPM 80 synchronously during each cycle of system operation, so as to produce the system output 39, as indicated at step 540, before the PPM 30 and RPM 80 start a new cycle of operation.

Returning to FIG. 2*a*, the following discussion will now describe the manner in which the primary PPM 30 and the redundant RPM 80 of the system 1 generate single-bit output data for each controlled point. The output circuit 50 receives single-bit output data from the primary PPM 30 and from the redundant RPM 80 via I/O buses 13*a-c* and buses 21*a-c*, respectively. The output circuits 50 communicate with each other via the read-only serial bus 17 to transfer its status and output data to the neighboring output circuits 50. The following discussion will use reference characters A1, B1, and C1 to identify a single bit of data produced by respective PPMs 30*a-c*, and reference characters A2, B2, and C2 will be used to identify a single bit of data produced by respective RPMs 80*a-c*.

During normal system operation, each output circuit 50 calculates a logical sum of the output data that each output circuit 50 receives from neighboring output circuits 50*a-c*. As such, the output circuits 50*a-c* produce output 38 as a logical product of its own output data and the aforementioned logical sum. Outputs 38*a-c* of the associated output circuits 50*a-c* are connected together to provide the output 39 as a logical sum of output data generated by output circuits 50*a-c*. Thus, system 1 produces the output 39 for each controlled point as a result of two-out-of-three majority voting among of output data produced by three primary processor modules 30, the details of which will be discussed below.

Considering now the first comparison mode provided by the system 1, each output circuit 50*a-c* compares the output data that is received from the associated primary (PPM) 30 and redundant (RPM) 80 processor modules to identify any potential disparity between output data for each controlled point. With respect to the output circuit 50*a*, it receives data A1 and A2 from the PPM 30*a* and RPM 80*a* respectively and then compares the data received from the PPM 30*a* and RPM 80*a* bit-to-bit to identify any potential disparity between the output data received from the sensors associated with each controlled point that are providing input for the system. If there is no disparity, the output circuit 50*a* transfers data A1 to the output circuits 50*b* and 50*c* while the output circuit 50*a* also receives data B1 and C1 from output circuits 50*b* and 50*c*, respectively, as well. The output circuit 50*a* then calculates a logical sum (B1+C1) of the data and then produces an output 38*a* as a logical product in accordance with the following logical equation:

$$\text{OUT } A = A1\char`\^(B1+C1)$$

Similarly, the output circuit 50*b* receives data B1 and B2 from PPM 30*b* and RPM 80*b*, respectively, and then compares the data received from PPM 30*b* and RPM 80*b* bit-to-bit to identify any potential disparity between output data received from the sensors associated with each controlled point. If there is no disparity, the output circuit 50*b* transfers the data B1 to output circuits 50*a* and 50*c* while the output circuit 50*b* receives data A1 and C1 from output circuits 50*a* and 50*c*, respectively. The output circuit 50*b* then calculates a logical sum (A1+C1) data then produces its output 38*b* as a logical product in accordance with the following logical equation:

$$\text{OUT } B = B1\char`\^(A1+C1)$$

Additionally, the output circuit 50*c* receives data C1 and C2 from PPM 30*c* and RPM 80*c*, respectively, and then compares the data received from PPM 30*c* and RPM 80*c* bit-to-bit to identify any potential disparity between output data received from the sensors associated with each controlled point. If there is no disparity, the output circuit 50*c* transfers the data C1 to output circuits 50*a* and 50*b* while the output circuit 50*b* receives data A1 and B1 from output circuits 50*a* and 50*b*, respectively. The output circuit 50*c* then calculates a logical sum (A1+B1) data then produces its output 38*c* as a logical product in accordance with the following logical equation:

$$\text{OUT } C = C1\char`\^(A1+B1)$$

And the outputs 38*a*, 38*b*, and 38*c* are connected together to form output 39 of the redundant computer system 1 as a logical sum given by the following equation:

$$\text{SYSTEM OUTPUT} = \text{OUT } A + \text{OUT } B + \text{OUT } C = A1\char`\^(B1+C1) + B1\char`\^(A1++C1\char`\^(A1+B1) \quad (1)$$

The logical equation (1) is transformed to:

$$\text{SYSTEM OUTPUT} = A1\char`\^B1 + A1\char`\^C1 + B1\char`\^C1 \quad (2)$$

The equation (2) represents two-out-of-three voting that output circuits 50*a*, 50*b*, and 50*c* perform with output data that they received from primary processor modules 30*a*, 30*b*, and 30*c*. Under normal operation, therefore, the system 1 performs two-out-of-three majority voting among of output data produced by three primary processor modules 30.

A. Permanent Faults Analysis

Figure 5:
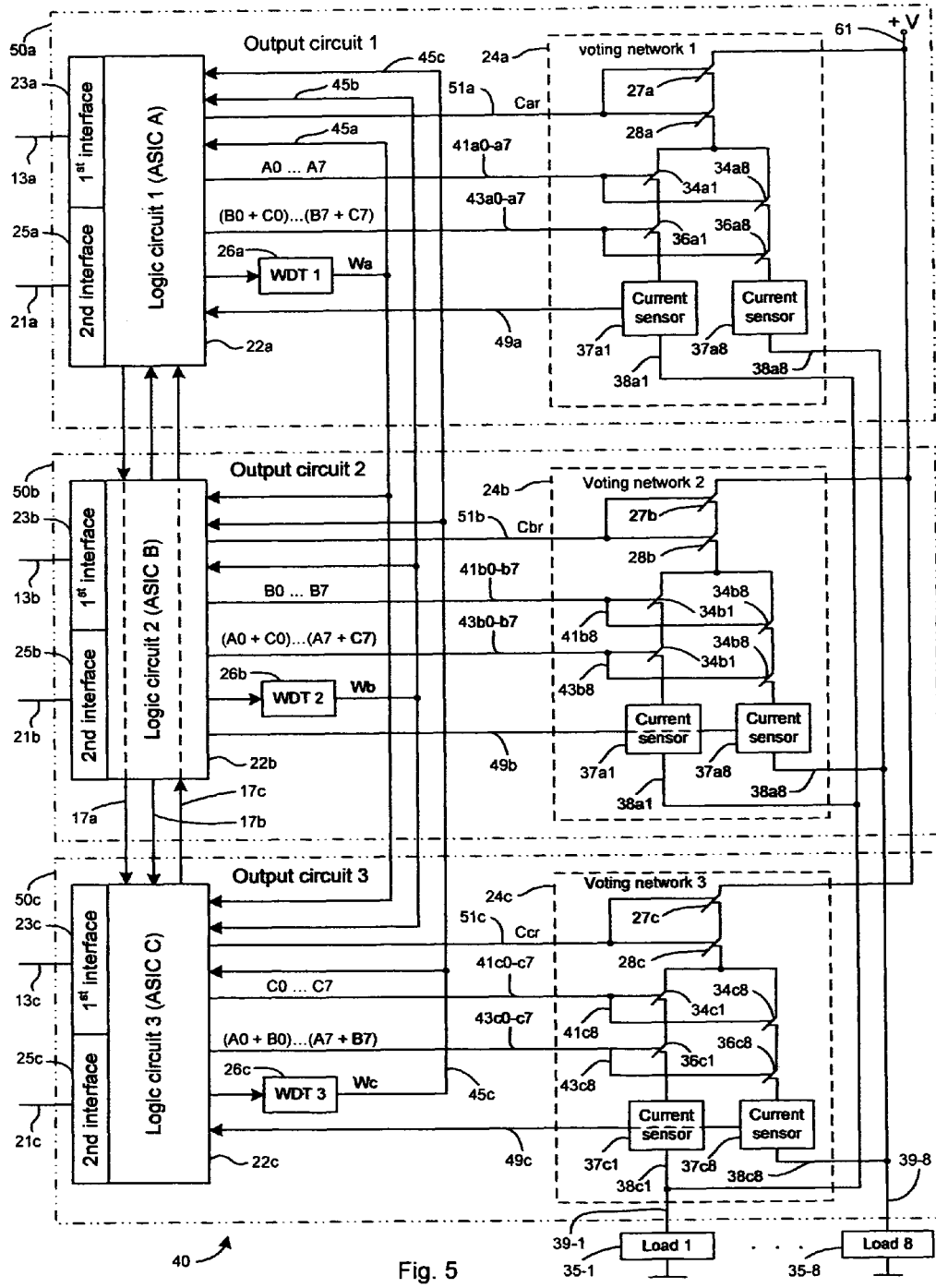
FIG. 5 is a block diagram showing an output module maintained by the multiple redundant computer system utilizing dissimilar redundancy technology in accordance with the concepts of the present invention.

With reference to FIGS. 2a and 5, the following discussion contemplates the operation of the multiple redundant computer system 1 in the presence of permanent faults. The followed analysis is applicable to both comparison mode and hot spare mode of system operation. Specifically, the output circuit 50 at the beginning of each scan sets an internal timer for the predetermined time interval and then proceeds to wait for the receipt of the output data from both the associated PPM 30 and RPM 80. In the event that the PPM 30 fails, it will not be able to transfer output data to the output circuit 50 before the expiration of the internal timer, and, as such, the output circuit 50 will then use the output data produced by the associated RPM 80. For example, if the PPM 30a fails, the output circuit 50a will then use the output data A2 produced by RPM 80a, and, thus, the system output 39 in this case is given by the equation:

$$\text{SYSTEM OUTPUT} = A2\char`\^B1 + A2\char`\^C1 + B1\char`\^C1$$

The multiple redundant computer system 1, therefore, is able to continue to perform two-out-of-three majority voting after the occurrence of a single permanent fault. As such, the system 1 is able to continue to perform two-out-of-three majority voting if the RPM 80a fails. Furthermore, in the event that the primary processor modules 30a-c fail at the same time due to a common cause failure, the redundant computer system 1 will continue to perform two-out-of-three majority voting among the data A2, B2, C2 received from the redundant processor modules (RPM) 80a-c, and, thus, the system output 39 is given then by equation:

$$\text{SYSTEM OUTPUT} = A2\char`\^B2 + A2\char`\^C2 + B2\char`\^C2$$

In general, the system 1 continues to perform two-out-of-three majority voting if at least three out of six processor modules, PPM 30a-c and RPM 80a-c, in any combination have not failed.

In the event, for instance, that PPM 30a, PPM 30c, and RPM 80b fail, outputs OUT A (38a), OUT B (38b), and OUT C (38c) are given by the following logical equations:

OUT $A = A2\char`\^(C2+B1)$; OUT $B = B1\char`\^(A2+C2)$; OUT $C = C2\char`\^(B1+A2)$;

where, the system output 39 is then given as follows:

SYSTEM OUTPUT=OUT A+OUT B+OUT C=$A2\char`\^B1+A2\char`\^C2+B1\char`\^C2$, which represents two-out-of-three majority voting among A2, B1, and C2 output data.

Next, the operation of the system 1 in the presence of a fault in the PPM 30 and associated RPM 80 will be presented. For example, if both PPM 30a and RPM 80a have failed, the output circuit 50a recognizes it and transfers A1='0' output data for each controlled points to neighboring output circuits 50b-c and uses the output data received from them. When the PPM 30a and RPM 80a fail, the output circuit 50a produces output 38a as follows:

OUT $A = (B1+C1)\char`\^(B1+C1) = B1+C1$

Neighboring output circuit 50b will produce output 38b as follows:

OUT $B = B1\char`\^(A1+ = B1\char`\^C1$, since A1='0

Neighboring output circuit 50c will produce output 38c similarly:

OUT $C = C1\char`\^(B1+A1) = C1\char`\^B1$, since A1='0'

And, thus, in accordance with that set forth above, the system output 39 is given as:

$$\text{SYSTEM OUTPUT} = (B1+C1) + B1\char`\^C1 + C1\char`\^B1 = B1 + C1, \quad (3)$$

whereby equation (3) represents two-out-of-two voting among B1 and C1 output data.

In the event that PPM 30b and RPM 80b fail, the output circuit 50b produces output 38b as follows:

OUT $B = (A1+C1)\char`\^(A1+C1) = A1+C1$;

while neighboring output circuit 50a will produce output 38a as follows:

OUT $A = A1\char`\^(B1+C1) = A1\char`\^C1$, since B1='0';

and neighboring output circuit 50c will produce output 38c as:

OUT $C = C1\char`\^(B1+A1) = C1\char`\^A1$, since B1='0'.

As such, the system output 39 is given then as:

$$\text{SYSTEM OUTPUT} = (A1+C1) + A1\char`\^C1 + C1\char`\^A1 = A1 + C1. \quad (4)$$

However, in the event that PPM 30c and RPM 80c fail, the output circuit 50b produces output 38c whereby:

OUT $C = (B1+A1)\char`\^(B1+A1) = B1+A1$;

neighboring output circuit 50a produces output 38a whereby:

OUT $A = A1\char`\^(B1+C1) = A1\char`\^B1$, since C1='0';

and neighboring output circuit 50b produces output 38b as:

OUT $B = B1\char`\^(A1+C1) = B1\char`\^A1$, since C1='0'.

As such, the system output 39 is given as:

$$\text{SYSTEM OUTPUT} = (B1+A1) + A1\char`\^B1 + B1\char`\^A1 = B1 + A1 \quad (5)$$

In accordance to with equations (3), (4), and (5), the multiple redundant computer system 1 is reconfigured from 2-out-of-3 voting to 2-out-of-2 voting when the PPM 30 and the associated RPM 80 concurrently fail.

However, in the event that both PPM 30a and RPM 80a fail along with both PPM 30b and RPM 80b, the system output 39 is given then as:

$$\text{SYSTEM OUTPUT} = (B1+C1)\char`\^(B1+C1) + (A1+C1)\char`\^(A1+C1) + (A1+B1)\char`\^(A1+B1) = C1; \text{ since } A1 = B1 = `0'.$$

Due to the symmetrical configuration of the components of the redundant computer system 1, it will produce its output 39 as output data received from the single PPM 30 or the single RPM 80 that is still operational (one-out-of-one voting), while all other processor modules have failed. For instance, if only RPM 80a is operational, the system output 39 will be established as:

$$\text{SYSTEM OUTPUT} = A2\char`\^(B1+C1) + (A2+C1)\char`\^(A2+C1) + (A2+B1)\char`\^(A2+B1) = A2, \text{ since } C1 = B1 = `0'.$$

The redundant computer system 1, therefore, still remains operational even though five out of six of the totals PPMs 30 and RPMs 80 have failed. The system 1, therefore, operating in comparison mode as well as in hot spare mode provides a significantly higher level of fault tolerance against permanent faults as compared with all other state-of-the-art redundant computer systems related to the same field of applications. Moreover, in the event that all six processor modules (PPMs 30a-c and RPMs 80a-c) fail, the system output 39 will enter the safe '0' state.

3. Transient Faults Analysis

The majority of transient faults that occur in the PPM 30 and the RPM 80 are discovered before they affect the outputs of the system 1, as the system 1 employs a comprehensive self-diagnostic and mutual diagnostic to detect possible system memory faults, interface faults, and communication faults. When a fault is discovered, the PPM 30 waits a predetermined number of scans and disables its outputs if the fault still exists. Identified transient faults, therefore, can be considered as permanent faults. In this case, the associated output module 50 uses output data provided by the associated RPM 80 as was described above.

The following discussion relates to the treatment of undiscovered transient faults when the system 1 is in a comparison mode. In this case, the PPM 30 produces output data that is different from data produced by the associated RPM 80, since either the PPM 30 or the RPM 80 may produce incorrect data due to the transient fault. Next, the output circuit 50 compares data received from associated PPM 30 and RPM 80 bit-to-bit to identify the possible disparity among output data for each controlled point. The output circuit 50 then transfers a logical '0' output data related to points having a disparity to neighboring output circuits 50 and uses a logical sum of output data received from them. For example, if either PPM 30a or RPM 80a generates incorrect data due to a transient fault, the output circuit 50a produces output 38a as follows:

OUT A=B1+C1, and the system output 39 is given by the equation:

$$\text{SYSTEM OUTPUT} = \text{OUT } A + \text{OUT } B + \text{OUT } C = (B1+C1) + B1\hat{}(A1+C1) + C1\hat{}(A1+B1), \quad (6)$$

whereby the logical equation (1) is transformed to:

$$\text{SYSTEM OUTPUT} = B1 + C1 + B1\hat{}C1 + C1\hat{}B1 = B1 + C1, \text{ since } A1='0'. \quad (7)$$

Equation (7) represents two-out-of-two voting among data that output circuits 50b and 50c perform with data B1 and C1 that is received from primary processor modules 30b and 30c.

However, in the event that either PPM 30b or RPM 80b generates incorrect data due to a transient fault, the output circuit 50b produces output 38b as follows:

$$\text{OUT } B = A1 + C1;$$

and the system output 39 is defined similarly due to symmetrical system configuration, as:

$$\text{SYSTEM OUTPUT} = A1 + C1, \text{ since } B1='0' \quad (8)$$

Equation (8) represents two-out-of-two voting among data that output circuits 50a and 50c perform with data A1 and C1 that is received from the primary processor modules (PPM) 30a and 30c.

In the event that either the PPM 30c or the RPM 80c generates incorrect data due to a transient fault, the output circuit 50c produces output 38c as follows:

$$\text{OUTPUT } C = A1 + B1, \text{ since } C1='0'.$$

And the system output 39 is defined similarly due to symmetrical system configuration, as:

$$\text{SYSTEM OUTPUT} = A1 + B1, \text{ since } C1='0'. \quad (9)$$

Equation (9) represents two-out-of-two voting among data that output circuits 50a and 50b perform with data A1 and B1 that is received from the primary processor modules (PPM) 30a and 30b.

Upon the occurrence of a single transient fault, therefore, the system 1 performs two-out-of-two majority voting with output data of controlled points in which the disparity among output produced by primary and redundant processor module is discovered. As can be appreciated, the system 1 will continue to perform two-out-of-three voting for points that have no disparity in the associated output data.

In the event that two PPMs 30 concurrently fail, both producing incorrect data, the system 1 generates output 39 as output data of the single PPM 30 that had not failed. For example, if PPM 30a and PPM 30b both fail, the output circuits 50a-c, respectively, produce output 38a-c as follows:

$$\text{OUT } A = C1 + B1 = C1, \text{ since } B1='0';$$

$$\text{OUT } B = A1 + C1 = C1, \text{ since } A1='0';$$

$$\text{OUT } C = C1\hat{}(A1+B1) = '0', \text{ since } A1=B1='0';$$

whereby the system output 39 is given as:

$$\text{SYSTEM OUTPUT} = \text{OUT } A + \text{OUT } B + \text{OUT } C = C1 + C1 + '0' = C1.$$

In the event that PPM 30a and RPM 80b fail, the system output will also be equal to C1 since the disparity is discovered when either PPM 30 or its associated RPM 80 fails. In the event that PPM 30 and the associated RPM 80 concurrently fail producing the same but incorrect data, the associated output circuit 50 will produce incorrect data since disparity is not discovered. If, for example, PPM 30a and RPM 80a fail, the system output 39 is defined by equation (2) as:

$$\text{SYSTEM OUTPUT} = A1\hat{}B1 + A1\hat{}C1 + B1\hat{}C1,$$

whereby incorrect data A1 will outvoted by two-out-of-three voting.

As discussed above, the redundant computer system 1 remains operational upon the occurrence of any type of two transient faults even if they are not discovered. If any transient fault is discovered, then the system 1 still remains operational upon the occurrence of up to five transient faults that have affected five processor modules, including PPMs 30a-c and RPMs 80a-c, in any combination.

Continuing, the following discussion contemplates the operation of the redundant computer system 1 in hot spare mode after the occurrence of a transient fault. When the system 1 is operating in hot spare mode, the three redundant processor modules 80a-c perform two-out-of-three voting among their input data if they work with digital input modules, and calculate the mid-value of input data if they work with analog input modules. In hot spare mode, the primary processor module (PPM) 30 communicates with neighboring PPMs 30, such that during each scan, its output data per controlled point is compared with output data produced by the two neighboring PPMs 30. In normal system operation output data produced PPM 30a-c are equal or close each to other being within predetermined limits. Output data produced by the PPM 30, however, can be different due to its transient fault with output data produced by neighboring PPM 30. The PPM 30 sets a disparity flag for each controlled point where the PPM 30 has discovered disparity of its output data with respect to output data produced by one neighbor PPM 30 or two neighboring PPMs 30. The PPM 30 not sets the disparity flag for the controlled points where disparity has not been identified. The PPM 30 then transfers the output data and the associated disparity flag for each controlled point to the associated output circuit 50. The output circuit 50 checks the disparity flag and uses the output data received from the PPM 30 for controlled points where the disparity flag is not set. For controlled points where the disparity flag is set, the output circuit 50 uses output data received from the redundant processor module 80 to avoid using doubtful output data produced by the PPM 30.

The following discussion contemplates the operation of output module 40 that is shown in FIG. 5. During normal system operation the disparity flag is reset for each controlled point, and the output module 40 then produces system output 39 per controlled point as the result of two-out-of-three voting among output data received from the three primary processor modules 30.

In the event that the first output circuit 50*a* defines that the disparity flag is set, it uses the data produced by the redundant processor module (RPM) 80*a* for each controlled point where disparity flag is set. In this case, the output module 40 will produce system as the result of two-out-of-three voting among the output data generated by the second PPM 30*b*, third PPM 30*c*, and first RPM 80*a* output per controlled point where disparity flag is set.

In the event that the second output circuit 50*b* defines that the disparity flag is set, it uses data produced by the second RPM 80*b* for each controlled point where disparity flag is set. In this case, the output module 40 will produce system output as the result of two-out-of-three voting among output data generated by the first PPM 30*a*, third PPM 30*c*, and second RPM 80*b* per controlled point where disparity flag is set.

In the event that the third output circuit 50*c* identifies that the disparity flag is set, it uses data produced by the third RPM 80*c* for each controlled point where disparity flag is set. In this case, the output module 40 will produce system output as the result of two-out-of-three voting among output data generated by first PPM 30*a*, second PPM 30*b*, and third RPM 80*c*. per controlled point where disparity flag is set.

In the event that the first and second output circuits 50*a*, 50*b* define that the disparity flag is set, they will respectively use output data produced by the first RPM 30*a* and the second RPM 30*b* for each controlled point where disparity flag is set. The output module 40 will produce system output as the result of two-out-of-three voting among output data generated by first RPM 80*a*, second RPM 80*b*, and third PPM 30*c* per controlled point where disparity flag is set.

In the event that the first and the third output circuits 50*a*, 50*c* define that the disparity flag is set, they will respectively use output data produced by the first RPM 80*a* and the third RPM 80*c* for each controlled point where disparity flag is set. The output module will produce system output as the result of two-out-of-three voting among output data generated by the first RPM 80*a*, second PPM 30*b*, and third RPM 80*c* per controlled point where disparity flag is set.

In the event that the second and third output circuits 50*b*, 50*c* define that disparity flag is set, they will respectively use the output data produced by the second RPM 80*b* and the third RPM 80*c* for each controlled point where disparity flag is set. And the output module 40 will produce system output as the result of two-out-of-three voting among output data generated by the first PPM 30*a*, second RPM 80*b*, and third RPM 80*c* per controlled point where disparity flag is set.

In the event that the first, second, and third output circuits define that the disparity flag is set, they will respectively use the output data produced by the first RPM 80*a*, second RPM 80*b*, and third RPM 80*c* for each controlled point where disparity flag is set. The output module will produce system output as the result of two-out-of-three voting among output data generated by the first, second, and third RPM 80 per controlled point where disparity flag is set.

In the hot spare mode, therefore, the redundant computer system 1 continues to provide two-out-of-three voting among output data in the presence of multiple transient faults occurring in the primary (PPM) 30 and redundant processor modules (RPM) 80 and/or in primary and redundant input modules 10, 60 that also may produce erroneous data due to transient faults. For instance, the system continues to operate properly in presence of three transient faults when two PPMs 30 and one RPM 80 have concurrently failed. A slight disadvantage of hot spare mode compared with comparison mode is that the system 1 will not be able to immediately provide a safe condition of controlled process in the case when three PPMs 30 produce equal but incorrect output data for the same controlled point due to concurrent transient faults.

C. Common Cause Faults

The system 1 of the invention provides protection against common cause faults. In accordance with an alternative approach, the system 1 employs three primary processor modules 30 that are identical to each other in software and hardware, and employs three redundant processor modules 80 that are also identical to each other in software and hardware. However, the primary processor module (PPM) 30 and redundant processor module (RPM) 80 are dissimilar in software and hardware with respect to each other, as they employ different processing elements. This dissimilar redundancy allows the system 1 to significantly decrease the probability of common cause system failure, which could occur due to software design errors or processing element faults. For example, if three primary processor modules (PPM) 30 concurrently fail due to common cause stress, such as a software error, the redundant computer system 1 will remain operational, by operating with three redundant processor modules 80.

In addition, the primary and redundant portions of the system 1 may be located in different cabinets to further decrease the probability of a common cause failure that could otherwise result upon the occurrence of a stress event, such as lightning or cosmic radiation, which is greater than the strength of the components in both the primary and redundant modules 30, 80. In accordance with this approach, the primary input circuits 10, the primary processor modules 30, and the output modules 40 are located in a first cabinet 82, while redundant input circuits 60 and the first, second, and third redundant processor modules 80 are located in a second cabinet 84.

In accordance with another alternative approach, the user of the system 1 is enabled to develop a primary control program for the primary processor modules (PPM) 30*a-c* and a redundant control program for the redundant processor modules (RPM) 80*a-c*. The primary and redundant control programs are designed to implement the same particular control tasks but are developed utilizing different kind of compilers, since the primary (PPM) 30 and redundant processor modules (RPM) 80 differ in hardware, and, as such, they deploy different kinds of processing elements. In one aspect, to avoid common errors within each program, it is desirable to develop a primary control program for a certain application using one team of programmers, and to develop the redundant control program for the same application using another team of programmers to ensure that the resultant code differs. This approach allows the system to significantly decrease the probability of a common cause failure. Further, such approach is important for the system 1 that is dedicated to provide programmable logic control functions such as sequence and continues (analog) control in accordance to the user tasks. The primary and redundant control programs can be respectively downloaded into the memory of PPMs 30*a-c* and the RPMs 80*a-c* via conventional data transfer/verify techniques. Some applications, however, require the ability to modify the control program executed by the system via an operator when intervention of the control program in the controlled process is required. As it was shown above in FIGS. 3, 4 the system 1 provides a method that allows the PPM 30 to on-line reload primary or redundant control program into redundant processor modules (RPM) 80 for the execution. PPM 30 then sends a command to the associated RPM 80 to start primary or redundant control program execution synchronously with primary control program execution.

The alternative embodiment of the system 2 shown in FIG. 2*b* provides first, second, and third redundant processor modules 80*a-c*, which are implemented as a single-chip redundant processor unit 90. The redundant processor unit (RPU) 90 can be radiation hardened and protected against electromagnetic interferences for increasing fault tolerance. The RPU 90 can to be able to use a conventional hot-swap technique for on-line removing in the event that RPU 90 fails and then on-line replaced by an operative RPU without interruption of system operation.

With respect to system operation in the presence of permanent and/or transient faults, the aforementioned alternative embodiment shown in FIG. 2*b* operates similarly to the embodiment discussed with regard to FIG. 2*b*. The system 2 of the alternative embodiment shown in FIG. 2*b* remains operational in the presence of up to two transient faults, and it is also able to operate properly in the presence of certain kind of three transient faults. With respect to permanent faults, the system 2 continues to operate properly in the event that three primary processors 30 concurrently fail or when redundant processor unit 90 and any two primary processor modules 30 concurrently fail. The system in the alternative embodiment, therefore, tolerates up to three permanent faults. The system in the alternative embodiment is not as reliable as the system of the exemplary embodiment since the system of that embodiment tolerates up to five permanent faults.

2. Output Module Description

The following will present a discussion of the output module 40, as shown in FIG. 5, which is utilized with the PPM 30 and the RPM 80, and which generates a single-bit output for each controlled point. In particular, the digital output module 40 is configured to process eight single-bit output data that is related to eight controlled points. The output module 40 includes three identical output circuits 50*a-c*, each of which is comprised of a logic circuit, such as an application specific integrated circuit (ASIC) 22*a-c*, and a voter network 24*a-c*. The ASICs 22*a-c* include an internal timer that is automatically set for the predetermined time interval. The ASICs 22*a-c* also include respective first interfaces 23*a-c* for receiving eight single-bit output data from the associated PPMs 30*a-c* via I/O bus 13*a-c*. In addition, the ASICs 22*a-c* include respective second interfaces 25*a-c* for receiving eight single-bit output data from the associated redundant RPMs 80*a-c* via I/O bus 21*a-c*. In particular, ASICs 22*a-c* communicate with each other via the read-only serial bus 17*a-*17*c*. Each individual ASIC 22*a-c* utilizes the bus 17*a-c* for transferring its status and output data to each of the neighboring ASICs 22*a-c*. The ASICs 22*a-c* provide no single point of failure by employing a triple modular redundancy configuration of all its circuits. It should be appreciated that the functions of the ASICs 22*a-c* are implemented in hardware form.

The output voter network 24 consists of eight pairs of electronic switches 34 and 36 connected in series with a current sensor 37 per each output point and provides for each point a corresponding output 38. The ASIC 22 outputs 41 and 43 control associated valves 34 and 36. The outputs 38 of the voting networks 24 are connected together providing a system output 39 for the corresponding load 35. The output 38 is de-energized when at least one valve in the pair of valves 34 and 36 is in the OFF condition. The voter network 24 also includes fault recovery valves 27 and 28 that are connected in series, which are normally ON. Fault recovery valves 27 and 28 are connected to each pair of valves 34 and 36. In normal operation, both valves 34 and 36 in series are ON and current flows from a terminal 61 of a power supply (not shown) through valves 27, 28 and then current is divided to eight paths, each including valves 34 and 36, the current sensor 37, and the associated load 35 in series. The corresponding output 38 is then energized.

Each output circuit further includes three identical watchdog timers 26*a-c*. The watchdog timer 26 is automatically set for the predetermined time interval. The watchdog timers 26*a-c* are devoted to monitoring the associated ASICs 22*a-c* and for disabling outputs of the ASICs 22*a-c* in the event that ASICs 22*a-c* fail to clear the associated timer 26 in the predetermined time interval. The watchdog timers 26*a-c* are connected to the associated ASICs 22*a-c*, as well as to each of the neighboring ASICs 22*a-c* to activate an alarm signal on a line 45 in the event that the associated ASIC 22 fails. Furthermore, the ASICs 22*a-c* produce an emergency C signal on line 51 for opening the associated fault recovery valves 27 and 28 when the associated voter network 24 fails. Such operation will be described in detail in the discussion presented below.

3. ASIC Logic Circuit Operation

Figure 6:
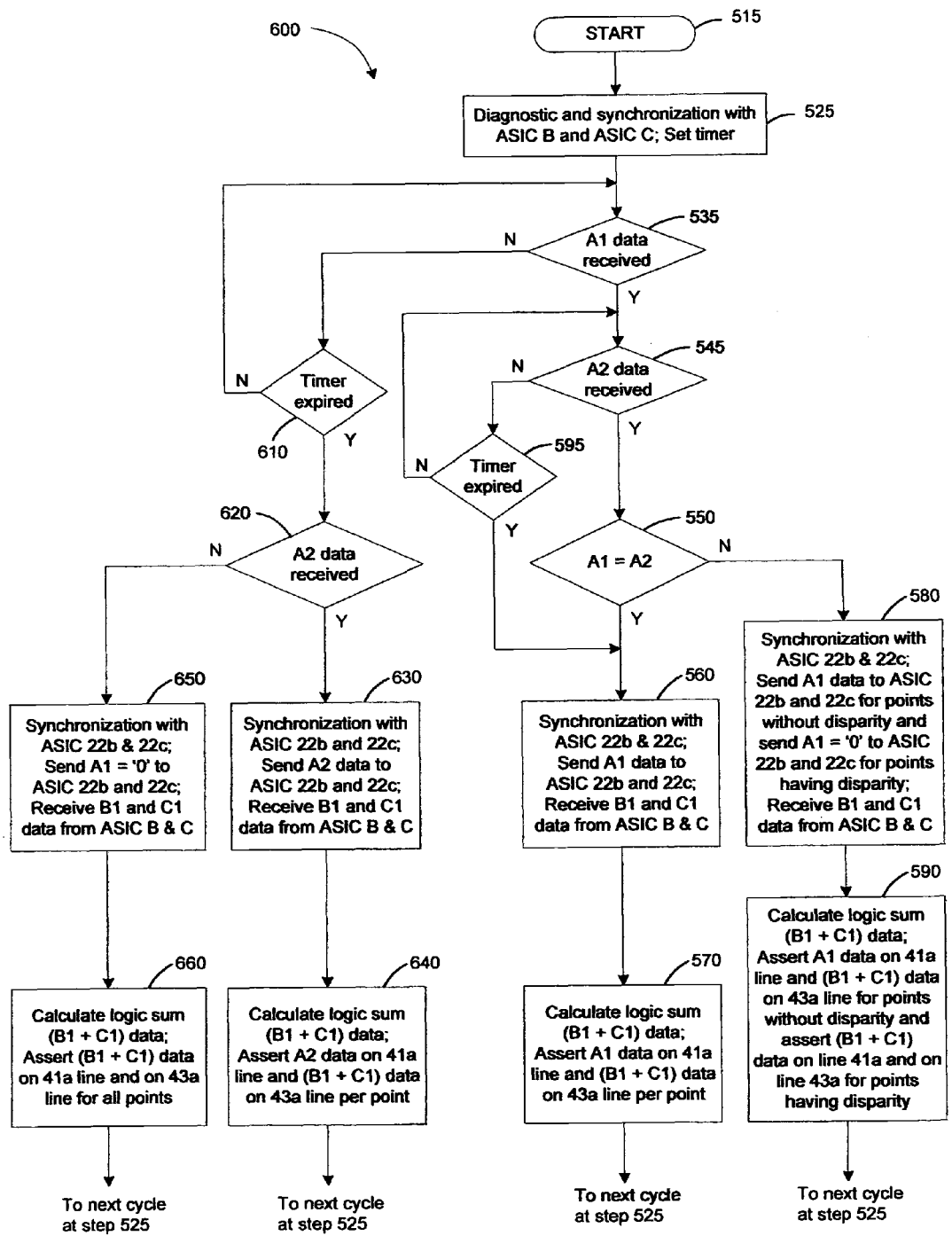
FIG. 6 is a flow chart showing the operation of the output circuit in accordance with the concepts of the present invention.

The following will present a discussion of the first output module 40, which, during normal operation, has no faults in its components, and, as such, the sequence of the operation of ASICs 22*a-c* is generally referred to by the numeral 600, as shown in FIG. 6 of the drawings. Furthermore, for clarification purposes, identifiers A1, B1, and C1 are used to designate single-bit data produced by the PPMs 30*a*, 30*b*, and 30*c*, respectively. And identifiers A2, B2, and C2 are used to designate single-bit data produced by RPMs 80*a*, 80*b*, and 80*c*. Because ASICs 22*a-c* are identical and due to the symmetrical configuration of the ASICs 22*a-c*, a discussion of only ASIC 22*a* will be presented. After power-up, as indicated at step 515, the ASIC 22*a* performs a self-diagnostic and synchronizes with ASIC 22*b* and ASIC 22*c* by sending its own status to them, as indicated at step 525. The ASIC 22*a* then communicates with the associated PPM 30*a* and the RPM 80*a* via interfaces 23*a* and 25*a*, respectively, using conventional procedures. The ASIC 22*a* sets its timer for the predetermined time interval and then waits for single-bit output data A1 from PPM 30*a*, as indicated at step 535. ASIC 22*b* and ASIC 22*c* at the same time communicate with PPM 30*b*, RPM 80*b*, PPM 30*c*, and RPM 80*c* to obtain B1 and C1 output data, respectively. After receiving A1 data, the process 500 continues to step 545, where the ASIC 22*a* checks if A2 data from the RPM 80a has been received or not. If both A1 and A2 data has been received, the process continues to step 550, where the ASIC 22a compares bit-to-bit of A1 and A2 data for each controlled point. If there are no disparities between A1 and A2 data, the process continues to step 560 where the ASIC 22a sends A1 data to ASIC 22b and ASIC 22c. At the same time, the ASIC 22a receives B1 and C1 data from ASIC 22b and ASIC 22c, respectively. Next at step 570, the ASIC 22a asserts the A1 data per point on single-bit outputs 41a0-41a7. At step 570, the ASIC 22a also calculates a logical sum (B1+C1) and asserts this sum as output data per point on single-bit outputs 43a0-43a7. The voter network 24a then provides output 38a (OUT A) per point as a logical product of A1 and (B1+C1):

$$\text{OUT } A = A1\char`\^(B1+C1)$$

As shown in FIG. 5, the outputs 38 of the voting networks 24 are connected together providing system output 39 as a logical sum of outputs 38a, 38b, and 38c. The system output 39 (OUTPUT) is defined due to the symmetrical output module configuration as follows:

$$\text{OUTPUT} = \text{OUT } A + \text{OUT } B + \text{OUT } C = A1\char`\^(B1+C1) + B1\char`\^(A1+C1) + C1\char`\^(A1+B1) \quad (10)$$

Equation (10) is transformed to OUTPUT=A1^B1+A1^C1+B1^C1 that represents 2-out-of-3 voting among A1, B1, and C1 data per controlled point.

Returning to step 550 of FIG. 6, if the disparity with A1 and A2 data is discovered for some controlled point, it means that either the primary processor module 30a or the redundant processor module 80a has produced incorrect output data for this point due to a transient fault, and the process continues to step 580. At step 580, the ASIC 22a disables A1 data by setting A1='0' for each point having A1, A2 data disparity and sends A1='0' to ASIC 22b and ASIC 22c. Next, at step 590, the ASIC 22a asserts (B1+C1) data on both single-bit outputs 41a0-41a7 and 43a0 . . . 43a7 for each point having disparity. As a result, voter network 24a provides output 38a (OUT A) as a logical product of (B1+C1) and (B1+C1) for each point having disparity. The system output 39 (OUTPUT) is given by:

$$\text{OUTPUT} = \text{OUT } A + \text{OUT } B + \text{OUT } C = (B1+C1)\char`\^(B1+C1) + B1\char`\^(A1+C1) + C1\char`\^(A1+B1) \quad (11)$$

Equation (11) is transformed to OUTPUT=(B1+C1)+B1^C1=(B1+C1) since A1='0'. Equation (11) represents 2-out-of-2 voting among B1 and C1 data for points having disparity. For points, however, have not disparity the process 500 at step 550 goes to steps 560, 570 providing system output 39 as the result of 2-out-of-3 voting in accordance to equation (10).

In the event that A1 data has been received at step 535, but A2 data has not been received at step 545, it is likely that the RPM 80a has failed due to a permanent fault. In this case, the timer expires, as indicated at step 595, but the ASIC 22a will continue to steps 560 and 570 to provide outputs 38 as a logical product of A1 and (B1+C1), as shown in FIG. 6. The system output 39 is then defined by equation (10), i.e., the system output 39 will again be the result of 2-out-of-3 voting among output data produced by the three PPMs 30a-c.

Returning to step 535 of the process 500, in the event that the PPM 30a fails, the timer expires as indicated at step 610, and A1 data is not received in time. Next, at step 620, the ASIC 22a checks if A2 data from the RPM 80a has been received or not. If A2 data has been received, the process 500 continues to step 630, where the ASIC 22a sends A2 data to the ASIC 22b and ASIC 22c. And at the same time, the ASIC 22a receives B1 and C1 data from the ASIC 22b and ASIC 22c, respectively. Next at step 640, the ASIC 22a asserts A2 data per point on single-bit outputs 41a0-41a7. At step 640, the ASIC 22a also calculates a logical sum (B1+C1) and asserts this sum as output data per point on single-bit outputs 43a0-43a7. As a result, the ASIC 22a provides each output 38a as a logical product of A2 and (B1+C1) for each point. The system output 39 (OUTPUT) is given by:

$$\text{OUTPUT} = \text{OUT } A + \text{OUT } B + \text{OUT } C = A2\char`\^(B1+C1) + B1\char`\^(A2+C1) + C1\char`\^(A2+B1) \quad (12)$$

Equation (12) is transformed to OUTPUT=A2/31+A2"C1+B1^C1 that represents 2-out-of-3 voting among A2, B1, and C1 data per point.

However, if both A1 and A2 data are not received via steps 535 and 620, the process 500 continues to step 650, where the ASIC 22a sets A1='0' for each point and sends A1='0' to ASIC 22b and ASIC 22c. Next, at step 660, the ASIC 22a calculates a logical sum (B1+C1) and asserts (B1+C1) data per point on single-bit outputs 41a0-41a7 and 43a0-43a7. As a result, the ASIC 22a provides each output 38a as a logical product of (B1+C1) and (B1+C1) for each point. The system output 39 (OUTPUT) is given by:

$$\text{OUTPUT} = \text{OUT } A + \text{OUT } B + \text{OUT } C = (B1+C1)\char`\^(B1+C1) + B1\char`\^(A1+C1) + C1\char`\^(A1+B1) \quad (13)$$

Equation (13) is transformed to OUTPUT=(B1+C1)+B1^C1=(B1+C1) since A1='0'. Equation (13) represents 2-out-of-2 voting among B1, and C1 data per each point.

Turning now to the output module 40, a discussion of its operation will be presented. First, we consider the operation of the ASIC 22 with A, B, and C data that, respectively, can be A1 or A2; B1 or B2; C1 or C2. In this way, we will consider the ASIC 22 operation with any combination of output data that the ASICs 22a-c receive from the PPMs 30 and from the RPMs 80. In normal operation, the PPMs 30 and the RPMs 80 produce equal output data, hence A1=A2=A; B1=B2=B; C1=C2=C.

Taking into consideration the signals 45 issued by the watchdog timers 26, the ASIC 22a asserts single-bit output data A0-A7 on outputs 41a0-41a7 and (B0+C0)-(B7+C7) output data on outputs 43a0-43a7 for the same points in accordance to logical equations:

$$Sa1 = A \quad Sc2 = (B+C)\char`\^Wc + A\char`\^(\underline{Wc\char`\^Wb}) \quad (14)$$

In the equation (14), signals Sa1 and Sc2 represent signals 41a and 43a, respectively. Signals A, B, and C represent single-bit output data per point generated by the associated PPM 30 or RPM 80. Wa, Wb, and Wc represent signals 45a, 45b, and 45c, respectively, whereby underlines included in the equations represent inverted values of the corresponding signals.

Taking in consideration signals 45 issued by the watchdog timers 26, the ASIC 22b asserts single-bit output data B0-B7 on outputs 41b0-41b7 and (A0+C0)-(A7+C7) output data on outputs 43b0-43b7 for the same points in accordance to logical equations:

$$Sb1 = B \quad Sa2 = (A+C)\char`\^Wa + B\char`\^(\underline{Wa\char`\^Wc}) \quad (15)$$

In the equation (15), signals Sb1 and Sa2 represent signals 41b and 43b, respectively. Signals A, B, and C represent for single-bit output data per point generated by the associated PPM 30 or RPM 80. Wa, Wb, and Wc represent signals 45a, 45b, and 45c, respectively, whereby underlines represent inverted values of the corresponding signals.

Taking into consideration signals 45 issued by the watchdog timers 26 the ASIC 22c asserts single-bit output data C0-C7 on outputs 41c0-41c7 and (A0+B0)-(A7+B7) output data on outputs 43c0-43c7 for the same points in accordance to logical equations:

$$Sc1 = C \hat{\ } Sb2 = (A+B) \hat{\ } Wb + C \hat{\ } (\overline{Wb \hat{\ } Wa}) \quad (16)$$

In the equations (16) signals Sc1 and Sb2 represent signals 41c and 43c, respectively. Signals A, B, and C represent for single-bit output data per point generated by the associated PPM 30 or RPM 80. Wa, Wb, and Wc represent signals 45a, 45b, and 45c, respectively. Underlines represent inverted values of the corresponding signals.

If both signals 41 and 43 produced by the ASIC 22 are in a logical '1' condition, then both corresponding valves 34 and 36 in series are ON, and the associated load 35 is energized. The system output 39 for a taking point, consequently, will be ON or energized if at least one out of three of the ASICs 22a-c produces a logical '1' signal for both 41 and 43 outputs related to this point. The system output 39, therefore, is defined as a logical sum, as follows:

$$OUTPUT = Sa1 \hat{\ } Sc2 + Sb1 \hat{\ } Sa2 + Sc1 \hat{\ } Sb2 \quad (17)$$

System outputs 39 are also depend on conditions of fault recovering valves 27, 28 that are controlled by emergency signals 51a (Car), 51b (Cbr), and 51c (Ccr). The ASIC 22 provide Car, Cbr, and Ccr signals in accordance with logical equations:

$$Car = Ca \hat{\ } Wa \quad Cbr = Cb \hat{\ } Wb \quad Ccr = Cc \hat{\ } Wc \quad (18)$$

In equation (18) Ca, Cb, and Cc are internal signals that ASIC 22a, ASIC 22b, and ASIC 22c, respectively, provide for controlling associated fault recovering valves 27 and 28. In normal operation Ca, Cb, and Cc signals are in logical '1' condition setting associated valves 27, 28 are ON since W signals are also in logical '1' condition. The system output 39 will be energized if at least one ASIC 22 sets logical '1' signals for both 41 and 43 outputs and the associated recovering valve 27 and 28 is ON. Taking fault recovering valves 27 and 28 in consideration, the equation (17) will transform to:

$$OUTPUT = Car \hat{\ } Sa1 \hat{\ } Sc2 + Cbr \hat{\ } Sb1 \hat{\ } Sa2 + Ccr \hat{\ } Sc1 \hat{\ } Sb2 \quad (19)$$

After substituting equations (14), (15), (16), and (18) into equation (19), the final equation for the system output 39 becomes:

$$OUTPUT = Ca \hat{\ } Wa \hat{\ } A \hat{\ } [(C+B) \hat{\ } Wc + A \hat{\ } (\overline{Wc \hat{\ } Wb})] + Cb \hat{\ } Wb \hat{\ } B \hat{\ } [(A+C) \hat{\ } Wa + B \hat{\ } (\overline{Wa \hat{\ } Wc})] + Cc \hat{\ } Wc \hat{\ } C \hat{\ } [(B+A) \hat{\ } Wb + C \hat{\ } (\overline{Wb \hat{\ } Wa})] \quad (20)$$

During normal operation of system 1, Ca=Cb=Cc='1', Wa=Wb=Wc='1'. Consequently, for normal operation, the system 1 equation (20) is transformed to:

$$OUTPUT = A \hat{\ } C + A \hat{\ } B + B \hat{\ } A + B \hat{\ } C + C \hat{\ } B + C \hat{\ } A = A \hat{\ } B + A \hat{\ } C + B \hat{\ } C \quad (21)$$

Under normal operation, therefore, the output circuits 50a, 50b, and 50c perform two-out-of-three majority voting among output data A, B, and C produced by the PPM 30 or the RPM 80 or produced by the PPM 30 and the RPM 80 in any combination thereof.

4. Fault Recovery

The following discussion now considers the operation of output circuit 50 shown in FIG. 5 in the presence of one or more faults.

A. One ASIC Fails

In the event that ASIC 22a fails, the watchdog timer (WDT) 26a cannot be cleared, and it overflows. In that case, the signal 45a (Wa) is passed to a logical '0' state driving the fault recovery valves 27a, 28a to an OFF condition, thereby preventing the system output 39 from the impact of potentially incorrect data produced by faulty ASIC 22a. As such, equation (20) will then transform to:

$$OUTPUT \ (ASIC \ 22a \ fails) = B \hat{\ } B + C \hat{\ } (B+A+C) = B+C$$

Similarly, in the event that ASIC 22b fails, the signal 45b (Wb) becomes '0', and system output 39 is given by:

$$OUTPUT \ (ASIC \ 22b \ fails) = A \hat{\ } (C+B+A) + C \hat{\ } C = A+C$$

The system output in the presence of ASIC 22c fault is defined similarly:

$$OUTPUT \ (ASIC \ 22c \ fails) = A \hat{\ } A + B \hat{\ } (A+C+B) = A+B$$

It should be appreciated that the ASICs 22a-c utilizes two-out-of three voting structure allowing ASIC 22 has no single point of failure. The output module 40, therefore, is still able to provide two-out-of-three voting with output data in the presence of a single ASIC 22 fault. In the event that two components of the ASIC 22 fail concurrently, then the output module 40 is reconfigured to perform two-out-of-two voting with the output data. A faulty condition of the output circuit 50 is indicated, and the errant output circuit can be online removed and replaced by an operative one. In an alternative embodiment, an additional hot-spare output module is used for automatically taking control on system outputs 39 in the event that primary output module 40 fails. It allows the system 1 to repair the faulty module online, and, therefore, two-out-of-three voting is restored without interruption of system 1 operation.

B. Two or Three ASICs Fail Concurrently

In the event that ASICs 22a and 22b concurrently fail, both signals 45a (Wa) and 45b (Wb) become '0'. The system output 39, however, will still be controlled by the ASIC 22c and the voter network 24c. Equation (20) will then transform to:

$$OUTPUT \ (ASIC \ 22a \ and \ ASIC \ 22b \ fails) = C \hat{\ } C = C$$

In the event that ASICs 22a and 22c concurrently fail, both signals 45a (Wa) and 45c (Wc) become '0'. The system output 39, however, will still be controlled by the ASIC 22b, and the voter network 24b is characterized as follows:

$$OUTPUT \ (ASIC \ 22a \ and \ ASIC \ 22c \ fails) = B \hat{\ } B = B$$

In the event that ASICs 22b and 22c concurrently fail, both signals 45b (Wb) and 45c (Wc) become '0'. The system output 39, however, will still controlled by the ASIC 22a and voter network 24a:

$$OUTPUT \ (ASIC \ 22b \ and \ ASIC \ 22c \ fails) = A \hat{\ } A = A$$

The output module 40, therefore, remains to operate properly with one operative ASIC 22. In the event that three ASICs fail at the same time, outputs 39 become '0' providing controlled process passing to safe condition. Alternately, if hot-spare output module is provided, the control on the system outputs 39 is automatically switched to the to the hot-spare output module, allowing the system 1 to maintain 2-out-of-3 voting continuously.

C. The ASIC and the Associated WDT Concurrently Fail

In the event that the ASIC 22 fails, the associated WDT 26 may also fail in such a way that it will not be able to discover a fault in the ASIC 22. In that case, the WDT 26 may hold the signal 45(W) in the '1' condition despite the presence of a fault in the associated ASIC 22. In the event that the ASIC 22 and the associated WDT 26 fail concurrently, holding the signal 45(W) signal in the '1' condition, the system output will be defined by equation (21):

$$OUTPUT = A\hat{\ }C + B\hat{\ }A + C\hat{\ }B$$

In that case, possible wrong data A, B, or C are outvoted by the voter networks 24 via 2-out-of-3 majority voting, providing corrected system output 39. The output module 40, therefore, still operates properly in the presence of ASIC 22 and the associated WDT 26 faults.

D. The ASIC and the Neighbor WDT Concurrently Fail

The following discussion will now address a situation where ASIC 22a and WDT 26b concurrently fail. In that event, the signal 45a (Wa) is set to '0', while the signal 45b (Wb) can be in a permanent '0' or '1' state due to the WDT 26b fault. The system output 39 then given by:

$$OUTPUT = C\hat{\ }C = C, \text{ if } Wb = '0'$$

$$OUTPUT = B\hat{\ }B + C\hat{\ }(B+C) = B+C, \text{ if } Wb = '1'$$

The system outputs 39 for other possible combinations of a faulty ASIC 22 and a faulty WDT 26 are defined similarly due to the symmetrical system configuration. In summary, the output module 40 remains operational in the presence of up to two faulty components including the ASIC 22 and the WDT 26.

The WDT 26 can also fail while the associated ASIC 22 is still operative. When the WTD 26 fails, it may hold the signal 45 in a permanent '0' or '1' condition. If the WDT 26 fails setting signal 45 to a '0' condition while the associated ASIC 22 is operative, then the outputs 38 of the associated voter network 24 will be disconnected from output 61 of the power supply. The output module behavior, therefore, will be the same as when one ASIC 22 fails. In a case where the WDT 26 fails holding its signal 45 in a '1' state permanently, the associated ASIC 22 will still control outputs 38 properly.

E. Voting Network Faults

With reference to FIG. 5, the manner in which faults in the voter networks 24 impact the operation of the output module 40 will be discussed. For instance, if valves 34a or 36a or both of them stuck OFF, equation (20) will transform to $$OUTPUT = '0' + B\hat{\ }(A+C) + C\hat{\ }(B+A) = A\hat{\ }B + B\hat{\ }C + A\hat{\ }C,$$
since output OUT A='0'

In the event that valve 34b or/and valve 36b stuck OFF, equation (20) will transform to:

$$OUTPUT = A\hat{\ }(C+B) + '0' + C\hat{\ }(B+A) = A\hat{\ }B + B\hat{\ }C + A\hat{\ }C,$$
since output OUT B='0'

In the event that valve 34c or/and valve 36c stuck OFF, equation (20) will transform to:

$$OUTPUT = A\hat{\ }(C+B) + B\hat{\ }(A+C) + '0' = A\hat{\ }B + B\hat{\ }C + A\hat{\ }C,$$
since output OUT C='0'

In the event that valves 34, 36 related to the same ASIC 22 stuck ON, the ASIC 22 quickly recognizes it since the ASIC 22 monitors the status of the associated valves 34, 36 many times per scan by reading associated current sensor 37. The current sensor 37 transmits a feedback signal 49 to the ASIC 22, which, in response, asserts C='0' emergency signal that in turn produces Cr='0' signal on line 51. As a result, the associated fault recovery valves 27 and 28 are passed to an OFF state, and the outputs 38 of the associated voter network are deactivated. Consider the situation where 34a1 and 36a1 fail ON. In this case, the ASIC 22a sets Ca='0' and Car=Wa^Ca signal is then also passed to '0'. Hence, the output 38a (OUT A) becomes '0' and equation (20) consequently transformed to:

$$OUTPUT = '0' + B\hat{\ }(A+C) + C\hat{\ }(B+A) = A\hat{\ }B + B\hat{\ }C + A\hat{\ }C,$$
since Wa=Wb=Wc='1' and Cb=Cc='1'

Figure 1:
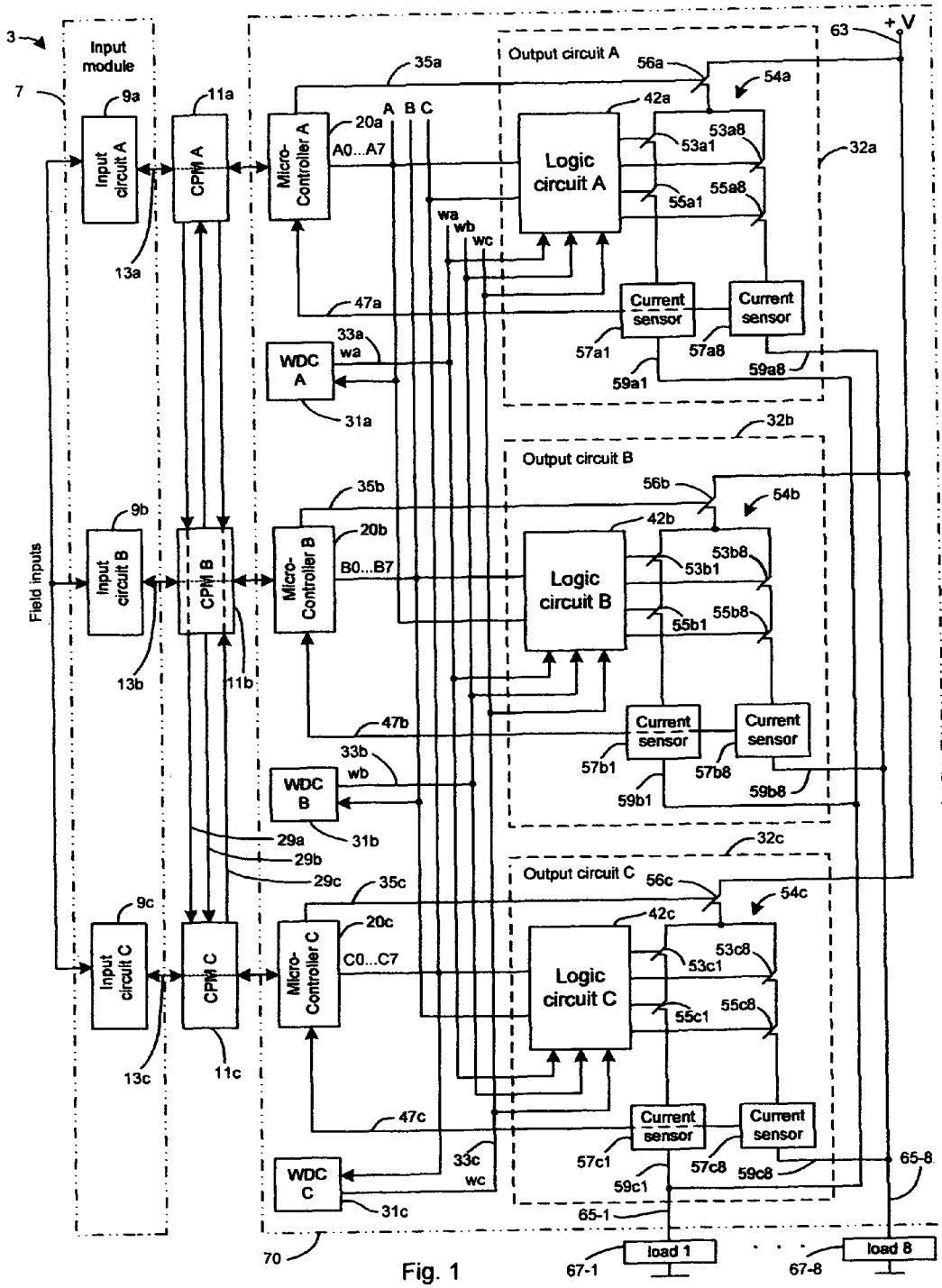
FIG. 1 is a block diagram of a prior-art hybrid triple redundant (HTR) computer system.

The output module 40, therefore, continues to provide 2-out-of-3 voting among data A, B, and C in the presence of up two faults in the voter network 24. Hence, the output module 40 of the invention provides a significantly higher level of tolerance than the output module presented in the prior of art shown in FIG. 1.

Another situation, however, takes place in the event that two voter networks concurrently fail. In this event, valves 34 or valves 36 related to different ASIC 22 concurrently fail. The output module 40 remains operational in this case but it degrades as shown in Table 1.

TABLE 1

| Valves 34 and 36 faults | System output 39 |
| --- | --- |
| 34a1 and 34b1 fails open | $C\hat{\ }(B + A) = C\hat{\ }B + C\hat{\ }A$ |
| 34a1 and 34c1 fails open | $B\hat{\ }(A + C) = B\hat{\ }A + B\hat{\ }C$ |
| 34b1 and 34c1 fails open | $A\hat{\ }(B + C) = A\hat{\ }B + A\hat{\ }C$ |
| 34a1 and 34b1 fails close | A + B + C |
| 34a1 and 34c1 fails close | A + B + C |
| 34a1 and 34c1 fails close | A + B + C |
| 34a1 and 36b1 fails close | B + C |
| 34a1 and 36c1 fails close | B + C |
| 34b1 and 36a1 fails close | A + C |
| 34b1 and 36c1 fails close | A + C |
| 34c1 and 36b1 fails close | A + B |
| 34c1 and 36a1 fails close | A + B |

From the above description, it is evident that one advantage of the system of the present invention is that the system provides uninterruptible operation in the presence of multiple faults that have occurred in the primary and redundant processor modules and/or in the primary and redundant I/O modules. Another advantage of the present invention is that the output module is able to remain operational in the presence of up to two faults, as well as in the presence of certain kinds of three faults.

It will be appreciated from foregoing that the present invention achieves the objects stated above. While this invention has been described with reference to exemplary embodiments it should be understood that this invention may be modified for using in other applications such as flight control and space vehicle control since the invention provides superior level of fault tolerance and safety. The system can also support a hot spare input and output module, which take control if a fault is detected in the primary I/O module during operation. These and other modifications may be made without departing from the spirit of the invention. Therefore, to appreciate the scope of the present invention, reference should be made to the following claims.

What is claimed is:

1. A multiple redundant control system comprising:
   a) at least one primary input module including first, second, and third input circuits operating in parallel for receiving process data for each controlled point;

b) at least one output module including first, second, and third output circuits operating in parallel, outputs of said output circuits are connected together for providing system output for each controlled point;

c) each of said output circuits including a first and a second interface;

d) a first, a second, and a third primary processor module operating in parallel;

e) said first, second, and third primary processor modules respectively connected to said first, second, and third input circuits of the primary input module for receiving input data from the associated input circuit, and for using the input data as input to a control program to generate output data by execution of the control program;

f) said first, second, and third primary processor modules coupled together for sending a status and input/output data to each other to provide synchronous operation of said primary processor modules;

g) said first, second, and third primary processor modules are connected to the first interface of said first, second, and third output circuits respectively for delivering an output data to the associated output circuit;

h) at least one redundant input module including first, second, and third input circuits operating in parallel for receiving process data for each controlled point;

i) a first, a second, and a third redundant processor module operating in parallel;

j) said first, second, and third redundant processor modules respectively connected to said first, second, and third input circuits of the redundant input module for receiving input data from the associated input circuit, and for using the input data as input to said control program to generate output data by execution of the control program;

k) said first, second, and third redundant processor modules coupled together for sending a status and input/output data to each other to provide synchronous operation of said redundant processor modules;

l) said first, second, and third redundant processor modules are connected to the second interface of said first, second, and third output circuits respectively for delivering output data to the associated output circuit;

m) said first, second, and third primary processor modules are respectively connected to said first, second, and third redundant processor modules for allowing each said primary processor module to send a command to the associated redundant processor module to begin said control program execution, thereby allowing each said primary processor module and the associated redundant processor module to synchronously execute said control program;

n) means in the output circuit for detecting the occurrence of a fault in the associated primary processor module, and using output data received from the redundant processor module in the event that the primary processor module fails;

o) means in the output module for producing a system output as the result of two-out-of-three voting among output data generated by said first, second, and third primary processor module;

p) means in the output module for producing the system output as the result of two-out-of-three voting among output data generated by said first, second, and third redundant processor modules if said first, second, and third primary processor module concurrently fail;

q) means in the output module for producing the system output as the result of two-out-of-three voting among output data generated by three processor modules, each of said processor modules comprising said primary processor module or said associated redundant processor module if said primary processor module fails;

r) means in the output module for producing the system output as the result of two-out-of-two voting among output data generated by two processor modules, each of said processor modules comprising said primary processor module or said associated redundant processor module if said primary processor module fails and all other said processor modules fail;

s) means in the output module for producing the system output as the result of one-out-of-one voting of output data received from said primary processor module or from said redundant processor module if all other processor modules fail, thereby allowing the system to remain operational even though five processor modules out of six fail; and t) means in output module for driving the system output to a safe condition in the event that all primary and redundant processor modules concurrently fail.

2. The multiple redundant control system of claim 1 wherein:

a) said primary processor modules are different from said redundant processor modules in hardware and firmware for reducing the probability of a common cause failure occurrence in said primary processor modules and said redundant processor modules.

3. The multiple redundant control system of claim 1 wherein:

a) the primary input module, the first, second, and third primary processor modules and the output module are altogether located in a first cabinet, and the redundant input module and said first, second, and third redundant processor modules located in a second cabinet; and b) said first and second cabinets are physically and electrically isolated from each other for reducing the probability of a common cause failure occurrence in said primary processor modules and said redundant processor modules.

4. The multiple redundant control system of claim 1 further comprising:

a) means in the output circuit for detecting the occurrence of a fault in the associated primary processor module and using output data received from the redundant processor module in the event that the primary processor module fails;

b) means in said first, second, and third output circuit for transferring its status and output data received from primary processor module or from redundant processor module to each other, thereby allowing each output circuit to receive output data generated by three processor modules, each of said processor modules comprising said primary processor module or said associated redundant processor module if said primary processor module fails;

c) means in each output circuit for providing its output as a logical product of its output data and a logical sum of output data received from two neighboring output circuits;

d) means in said first, second, and third output circuits for generating the system output as a logical sum of the outputs produced by said output circuits, thereby generating the system output as a result of two-out-of-three voting among output data that said output circuits received from three processor modules, each of said processor modules comprising said primary processor module or said associated redundant processor module if said primary processor module fails;

e) means in the output circuit for comparing output data received from said associated primary processor and redundant processor modules; said means are used for discovering disparity between said output data for each controlled point due to a transient fault occurrence in associated primary or redundant processor module;

f) means in said first, second, and third output circuits for generating the system output as a result of two-out-of-three voting among output data that said output circuits receives from three processor modules for each controlled point in which said disparity is not discovered, each of said processor modules comprising said primary processor module or said associated redundant processor module if said primary processor module fails;

g) means in said first, second, and third output circuits for generating the system output as a result of two-out-of-two voting among output data that each of said output circuits receives from said first and second primary processor modules for controlled points where disparity between output data that the third output circuit received from the third primary and the third redundant processor module is discovered;

h) means in said first, second, and third output circuits for generating the system output as a result of two-out-of-two voting among output data that each of said output circuits receives from said first and third primary processor modules for controlled points where disparity between output data that the second output circuit received from the second primary and the second redundant processor module is discovered;

i) means in said first, second, and third output circuits for generating the system output as a result of two-out-of-two voting among output data that each of said output circuits receives from second and third primary processor modules for controlled points where disparity between output data that the first output circuit received from the first primary and the first redundant processor module is discovered;

j) means in said first, second, and third output circuits for generating the system output as a result of one-out-of-one voting with output data that each of said output circuits receives from first primary processor module for controlled points where disparity between output data that second and third output circuit received from their associated primary and redundant processor module is discovered;

k) means in said first and third output circuits for generating the system output as a result of one-out-of-one voting with output data that each of said output circuits receives from second primary processor module for controlled points where disparity between output data that first and third output circuit received from their associated primary and redundant processor module is discovered;

l) means in said first, second, and third output circuits for generating the system output as a result of one-out-of-one voting with output data that each of said output circuits receives from third primary processor module for controlled points where disparity between output data that first and second output circuit received from their associated primary and redundant processor module is discovered; and m) means in said first, second, and third output circuits for driving the system output to a safe condition for controlled points where disparity between output data that each output circuit receives from said associated primary and redundant processor modules is discovered.

5. The multiple redundant control system of claim 4 wherein:

a) said first, second, and third output circuit respectively includes said first, second, and third logic circuit each of which is connected to the associated primary processor module over said first interface and connected to the associated redundant processor module over said second interface for receiving output data from said processor modules; said first, second, and third output circuit further including first, second, and third voter network respectively;

b) each logic circuit includes means for detecting the occurrence of a fault in the associated primary processor module, and using output data received from the redundant processor module in the event that the primary processor module fails;

c) each logic circuit is connected to both neighboring logic circuits for transferring own status and output data to each other, thereby allowing the logic circuit to receive output data generated by three processor modules, each of said processor modules comprising said primary processor module or said associated redundant processor module if said primary processor module fails;

d) each logic circuit provides a first and a second output for each controlled point;

e) each logic circuit asserts output data received from said primary processor module or from said associated redundant processor module on said first output, and calculates a logical sum of output data received from neighboring logic circuits and asserts said logical sum on said second output;

f) each said voter network is connected to said first and second outputs of the associated logic circuit;

g) the output of said first voter network is produced as a logical product of output data of said first logic circuit and a logical sum of output data that said first logic circuit receives from said second and third logic circuits;

h) the output of second voter network is produced as a logical product of output data of said second logic circuit and a logical sum of output data that said second logic circuit receives from said first and third logic circuits;

i) the output of third voter network is produced as a logical product of output data of said third logic circuit and a logical sum of output data that said third logic circuit receives from said first and second logic circuits;

j) said outputs of said first, second, and third voter networks connected together for generating the system output as a logical sum of output data producing on outputs of said first, second, and third voter networks, thereby providing the system output as a result of two-out-of-three voting among output data generated by three processor modules, each of said processor modules comprising said primary processor module or said associated redundant processor module if said primary processor module fails;

k) said first logic circuit transfers a logical '0' output data to said second and third output circuits if said first primary and first redundant processor module fails, said first logic circuit calculates a logical sum of output data received from said second and third logic circuit and asserts output data as said logical sum on its first and second output, thereby providing the system output as a result of two-out-of-two voting among output data generated by said second and third primary processor modules if said first primary and first redundant processor module fails;

l) said second logic circuit transfers a logical '0' output data to said second and third output circuits if said second primary and second redundant processor module fails, said second logic circuit calculates a logical sum of output data received from said first and third logic circuit and asserts output data as said logical sum on its first and second output, thereby providing the system output as a result of two-out-of-two voting among output data generated by said first and third primary processor modules if said second primary and second redundant processor module fails;

m) said third logic circuit transfers a logical '0' output data to said first and second output circuits if said third primary and third redundant processor module fails, said third logic circuit calculates a logical sum of output data received from said first and second logic circuit and asserts output data as said logical sum on its first and second output, thereby providing the system output as a result of two-out-of-two voting among output data generated by said first and second primary processor modules if said third primary and third redundant processor module fails;

n) said third logic circuit including means for transferring a logical '0' output data to said first and second output circuits and means for producing said first and second output as a logical sum of output data received from said first and second output circuits for each controlled points if third primary and third redundant processor module fails, thereby providing two-out-of-two voting among output data generating by first and second primary processor modules if third primary and third redundant processor module fails;

o) means in said first and second logic circuit transfer a logical '0' output data to said third logic circuit, whereby the system output is a result of one-out-of-one voting with output data that said third logic circuit received from the associated primary processor module if said first and second primary processor module fails, and also first and second redundant processor module fails;

p) said first and third logic circuit transfer a logical '0' output data to said second logic circuit whereby the system output is a result of one-out-of-one voting with output data that said second logic circuit receives from the associated primary processor module if said first and third primary processor module fails, and also first and third redundant processor module fails;

q) said second and third logic circuit transfer a logical '0' output data to said first logic circuit, whereby system output is a result of one-out-of-one voting with output data that said first logic circuit receives from the associated primary processor module if said second and third primary processor module fails, and also second and third redundant processor module fails; and r) said first, second, and third logic circuits transfer a logical '0' output data to each others, thereby driving the system output to a safe condition in the event that three said primary processor modules and three said redundant processors modules concurrently fail.

6. The multiple redundant control system of claim 5 wherein:

a) said logic circuit further including means for comparing output data received from the associated primary processor module and redundant processor module for each controlled point, said means are used for discovering disparity between said output data due to occurrence of transient fault in said primary or said redundant processor module;

b) said first, second, and logic circuits produces the system output as a result of two-out-of-three voting among output data that said output circuits received from three processor modules for each controlled point in which said disparity is not discovered, each of said processor modules comprising said primary processor module or said associated redundant processor module if said primary processor module fails;

c) said first, second, and third logic circuits produces the system output as a result of two-out-of-two voting among output data that each of said logic circuits received from said first and second primary processor modules for controlled points where disparity between output data that the third logic circuit received from the third primary and the third redundant processor module is discovered;

d) said first, second, and third logic circuits produces the system output as a result of two-out-of-two voting among output data that each of said logic circuits received from said first and third primary processor modules for controlled points where disparity between output data that the second logic circuit received from the second primary and the second redundant processor module is discovered;

e) said first, second, and third logic circuits produces the system output as a result of two-out-of-two voting among output data that each of said logic circuits received from said first and second primary processor modules for controlled points where disparity between output data that the third logic circuit received from the third primary and the third redundant processor module is discovered;

f) the first logic circuit transfers a logical '0' output data to the second and third output circuits, said first logic circuit calculates a logical sum of output data received from said second and third logic circuit and asserts output data as said logical sum on its first and second output for each controlled points where disparity between output data produced by said first primary and first redundant processor is discovered, thereby providing the system output to be a result of two-out-of-two voting among output data generated by second and third primary processor modules for said controlled points;

g) the second logic circuit transfers a logical '0' output data to the second and third output circuits, said second logic circuit calculates a logical sum of output data received from said first and third logic circuit and asserts output data as said logical sum on its first and second output for each controlled points where disparity between output data produced by said second primary and second redundant processor is discovered, thereby providing the system output to be a result of two-out-of-two voting among output data generated by first and third primary processor modules for said controlled points;

h) the third logic circuit transfers a logical '0' output data to the first and second output circuits, said third logic circuit calculates a logical sum of output data received from said second and third logic circuit and asserts output data as said logical sum on its first and second output for each controlled points where disparity between output data produced by said third primary and third redundant processor is discovered, thereby providing the system output to be a result of two-out-of-two voting among output data generated by first and second primary processor modules for said controlled points;

i) said first, second, and third logic circuits perform one-out-of-one voting with output data that first logic circuit received from first primary processor module for each controlled points where disparity between output data produced by second primary and second redundant processor is discovered and disparity between output data produced by third primary and third redundant processor is also discovered, thereby providing the system output to be a result of one-out-of-one voting among output data generated by first primary processor module for said controlled points;

j) said first, second, and third logic circuits perform one-out-of-one voting with output data that second logic circuit received from second primary processor module for each controlled points where disparity between output data produced by first primary and first redundant processor is discovered and disparity between output data produced by third primary and third redundant processor is also discovered, thereby providing the system output to be a result of one-out-of-one voting among output data generated by second primary processor module for said controlled points;

k) said first, second, and third logic circuits perform one-out-of-one voting with output data that third logic circuit received from third primary processor module for each controlled points where disparity between output data produced by second primary and second redundant processor is discovered and disparity between output data produced by first primary and first redundant processor is also discovered, thereby providing the system output to be a result of one-out-of-one voting among output data generated by third primary processor module for said controlled points; and l) said first, second, and third logic circuit drives its output to a safe condition for controlled points where disparity of output data that is received from the associated primary and redundant processor modules in each of said logic circuits is discovered, thereby providing the system output in a safe condition.

7. The multiple redundant control system of claims 6 wherein:

a) each said logic circuit connected to the associated voter network for detecting faults in said voter network and for activating an emergency signal that disables outputs of said voter network in the event that said voter network fails;

b) said system output is produced as a result of two-out-of-three voting among output data that said first, second, and third logic circuits receive from the associated primary processor modules if said emergency signal in each said logic circuit is not activated;

c) said system output is produced as a result of two-out-of-two voting among output data that two said logic circuits receive from the associated primary processor modules in the event that one voter network fails and said associated emergency signal is activated;

d) said system output is produced as a result of one-out-of-one voting of output data that one said logic circuit receive from the associated primary processor module if two voter networks fail and said associated emergency signals are activated;

e) said system output is driving to a safe condition if three voter networks fail and said associated emergency signals are activated;

f) said output circuit further comprising a first, a second, and a third watchdog timer each of which is set for a predetermined period of time, and respectively connected to said first, second, and third logic circuits for detecting the occurrence of a fault in the associated logic circuit and for activating an alarm signal in the event that the associated logic circuits fail;

g) said system output is produced as a result of two-out-of-three voting among output data that said first, second, and third logic circuits receive from the associated processor modules if said alarm signal in each watchdog timer is not activated;

h) said system output is produced as a result of two-out-of-two voting among output data that two logic circuits received from the associated processor modules if said alarm signal associated with the faulty logic circuit is activated;

i) said system output is produced as a result of one-out-of-one voting of output data that said one logic circuit receive from the associated processor module if two said alarm signals associated with two faulty logic circuits are activated;

j) said system output is disabled if three said alarm signals associated with three faulty logic circuits are activated, said system output is driven to a safe condition when three said logic circuits fail; and k) the logic circuit utilizes single error-correcting and double error-detecting codes for detecting possible communication errors in the output data that the logic circuit receives from said neighboring logic circuits, the logic circuit asserts its own output data on both said first and second outputs if output data errors are detected but not corrected in at least one of neighboring logic circuits, thereby providing the associated output module to produce correct output data on system outputs in the presence of said communication errors.

8. The multiple redundant control system of claim 7 wherein:

a) each said logic circuit is implemented as an application specific integrated circuit (ASIC) to decrease susceptibility of said associated output module to a common cause failure;

b) said ASIC utilizes a two-out-of-three majority voting configuration for providing uninterrupted operation of said logic circuit in the presence of any single fault, thereby increasing reliability of said logic circuit; and c) said ASIC is protected against electromagnetic interference for further increasing reliability of said logic circuit.

9. The multiple redundant control system of claim 1 wherein:

a) said first, second, and third redundant processor modules are located on a common board as a one triple module unit, said triple module unit configured to be on-line removed and replaced in the event that at least one redundant processor module fails.

10. The multiple redundant control system of claim 1 wherein:

a) said first, second, and third redundant processor modules are implemented as a single-chip redundant processor unit to provide a compact configuration of said redundant processor modules, thereby decrease complexity of the system;

b) said redundant processor unit utilizes a two-out-of-three majority voting configuration for providing said redundant processor unit uninterrupted operation in the presence of any single fault, thereby increasing reliability of said redundant processor unit;

c) the redundant processor unit is radiation hardened and protected against electromagnetic interference for further increasing reliability of said redundant processor unit; and d) the redundant processor unit configured to be on-line removed and replaced in the event that said redundant processor unit fails.

11. The multiple redundant control system of claim 1 wherein:

a) the primary processor module further comprising means for loading a primary control program and a redundant control program, said primary and redundant control programs are used respectively by said primary and said redundant processor modules to implement the same tasks, but said primary and redundant control programs are different in software code for decreasing the probability of a common design failure;

b) said first, second, and third primary processor modules are respectively connected to said first, second, and third redundant processor modules, wherein each said primary processor module is able to load said redundant control program on-line to the associated redundant processor module and to send the command to the associated redundant processor to begin execution of said redundant control program synchronously with the execution of said primary control program; and c) each said redundant processor module has means for verifying the integrity of the redundant control program, and if errors in said redundant control program are discovered the redundant control program is received from one of its neighbor redundant processor modules.

12. A multiple redundant control system comprising:

a) at least one primary input module including first, second, and third input circuits operating in parallel for receiving process data for each controlled point;

b) at least one output module including first, second, and third output circuits operating in parallel, outputs of said output circuits are connected together for providing system output for each controlled point;

c) each of said output circuits including a first and a second interface;

d) a first, a second, and a third primary processor module operating in parallel;

e) said first, second, and third primary processor modules respectively connected to said first, second, and third input circuits of the primary input module for receiving input data from the associated input circuit, and for using the input data as input to a control program to generate output data by execution of the control program;

f) said first, second, and third primary processor modules coupled together for sending a status and input/output data to each other to provide synchronous operation of said primary processor modules;

g) said first, second, and third primary processor modules are connected to the first interface of said first, second, and third output circuits respectively for delivering an output data to the associated output circuit;

h) at least one redundant input module including first, second, and third input circuits operating in parallel for receiving process data for each controlled point;

i) a first, a second, and a third redundant processor module operating in parallel;

j) means in the redundant processor modules for receiving input data from neighbor redundant processor modules, said redundant processor modules perform two-out-of-three voting among said input data for using a result of two-out-of-three voting as input for the control program;

k) said first, second, and third redundant processor modules coupled together for sending a status and input/output data to each other to provide synchronous operation of said redundant processor modules;

l) said first, second, and third redundant processor modules are connected to the second interface of said first, second, and third output circuits respectively for delivering output data to the associated output circuit;

m) said first, second, and third primary processor modules are respectively connected to said first, second, and third redundant processor modules for allowing each of said primary processor module to send a command to the associated redundant processor module to begin said control program execution, thereby providing each said primary processor module and the associated redundant processor module to synchronously execute said control program;

n) means in the output circuit for detecting the occurrence of a fault in the associated primary processor module, and using output data received from the redundant processor module in the event that the primary processor module fails;

n) means in the output circuit for detecting the occurrence of a fault in the associated primary processor module, and using output data received from the redundant processor module in the event that the primary processor module fails; o) means in the output module for producing a system output as the result of two-out-of-three voting among output data generated by said first, second, and third primary processor module; p) means in the output module for producing the system output as the result of two-out-of-three voting among output data generated by said first, second, and third redundant processor modules if said first, second, and third primary processor module concurrently fail; q) means in the output module for producing the system output as the result of two-out-of-three voting among output data generated by three processor modules, each of said processor modules comprising said primary processor module or said associated redundant processor module if said primary processor module fails; r) means in the output module for producing the system output as the result of two-out-of-two voting among output data generated by two processor modules, each of said processor modules comprising said primary processor module or said associated redundant processor module if said primary processor module fails and all other said processor modules fail; s) means in the output module for producing the system output as the result of one-out-of-one voting of output data received from said primary processor module or from said redundant processor module if all other processor modules fail, thereby allowing the system to remain operational even though five processor modules out of six fail; and t) means in the output module for driving the system output to a safe condition in the event that all primary and redundant processor modules concurrently fail. of said processor modules comprising said primary processor module or said associated redundant processor module if said primary processor module fails;

q) means in the output module for producing the system output as the result of two-out-of-two voting among output data generated by two processor modules, each of said processor modules comprising said primary processor module or said associated redundant processor module if said primary processor module fails and all other said processor modules fail;

r) means in the output module for producing the system output as the result of one-out-of-one voting of output data received from said primary processor module or from said redundant processor module if all other processor modules fail, thereby allowing the system to remain operational even though five processor modules out of six fail; and s) means in the output module for driving the system output to a safe condition in the event that all primary and redundant processor modules concurrently fail.

13. The multiple redundant control system of claim 12 wherein:

a) said primary processor modules are different from said redundant processor modules in hardware and firmware for reducing the probability of a common cause failure occurrence in said primary processor modules and said redundant processor modules.

14. The multiple redundant control system of claim 12 wherein:

a) the primary input module, the first, second, and third primary processor modules and the output module are altogether located in a first cabinet, and the redundant input module and said first, second, and third redundant processor modules located in a second cabinet; and b) said first and second cabinets are physically and electrically isolated from each other for reducing the probability of a common cause failure occurrence in said primary processor modules and said redundant processor modules.

15. The multiple redundant control system of claim 12 further comprising:

a) means in each said primary processor module for comparing its output data with output data produced by said neighboring primary processor modules and setting a disparity flag for controlled points where disparity in said output data is discovered;

b) means in said primary processor module for sending its output data and said disparity flag to said associated output circuit;

c) means in each said output circuit for checking said disparity flag for each controlled point and using output data received from the associated primary processor module for controlled points where said disparity flag is not set;

d) means in each said output circuit for using output data received from the associated redundant processor module for controlled points where said disparity flag is set;

e) means in said output module for producing a system output as a result of two-out-of-three voting among output data generated by said first, second, and third primary processor modules for controlled points where said disparity flag is not set;

f) means in said output module for producing the system output as a result of two-out-of-three voting among output data generated by said first, second, and third redundant processor modules for controlled points where said disparity flag is set;

g) means in said output module for producing the system output as a result of two-out-of-three voting among output data generated by first redundant processor module, second primary processor module and third primary processor module for controlled points where said disparity flag is set by said first primary processor module;

h) means in said output module for producing the system output as a result of two-out-of-three voting among output data generated by said first primary processor module, second redundant processor module and third primary processor module for controlled points where said disparity flag is set by said second primary processor module;

i) means in said output module for producing the system output as a result of two-out-of-three voting among output data generated by said first primary processor module, second primary processor module and third redundant processor module for controlled points where said disparity flag is set by said third primary processor module;

j) means in said output module for producing the system output as a result of two-out-of-three voting among output data generated by said first redundant processor module, second redundant processor module and third primary processor module for controlled points where said disparity flag is set by said first and second primary processor module;

k) means in said output module for producing the system output as a result of two-out-of-three voting among output data generated by said first redundant processor module, second primary processor module and third redundant processor module for controlled points where said disparity flag is set by said first and third primary processor module; and l) means in said output module for producing the system output as a result of two-out-of-three voting among output data generated by said first primary processor module, second redundant processor module and third redundant processor module for controlled points where said disparity flag is set by said second and third primary processor module.

16. The multiple redundant control system of claim 15 wherein:

a) said first, second, and third output circuit respectively includes said first, second, and third logic circuit each of which is connected to the associated primary processor module over said first interface and connected to the associated redundant processor module over said second interface for receiving output data from said processor modules; said first, second, and third output circuit further including first, second, and third voter network respectively;

b) each logic circuit includes means for detecting the occurrence of a fault in the associated primary processor module, and using output data received from the redundant processor module in the event that the primary processor module fails;

c) each logic circuit is connected to both neighboring logic circuits for transferring own status and output data to each other, thereby allowing the logic circuit to receive output data generated by three processor modules, each of said processor modules comprising said primary processor module or said associated redundant processor module if said primary processor module fails;

d) each logic circuit provides a first and a second output for each controlled point;

e) each logic circuit asserts output data received from said primary processor module or from said associated redundant processor module on said first output, and calculates a logical sum of output data received from neighboring logic circuits and asserts said logical sum on said second output;

f) each said voter network is connected to said first and second outputs of the associated logic circuit;

g) the output of said first voter network is produced as a logical product of output data of said first logic circuit and a logical sum of output data that said first logic circuit receives from said second and third logic circuits;

h) the output of second voter network is produced as a logical product of output data of said second logic circuit and a logical sum of output data that said second logic circuit receives from said first and third logic circuits;

i) the output of third voter network is produced as a logical product of output data of said third logic circuit and a logical sum of output data that said third logic circuit receives from said first and second logic circuits;

j) said outputs of said first, second, and third voter networks connected together for generating the system output as a logical sum of output data producing on outputs of said first, second, and third voter networks, thereby providing the system output as a result of two-out-of-three voting among output data generated by three processor modules, each of said processor modules comprising said primary processor module or said associated redundant processor module if said primary processor module fails;

k) said first logic circuit transfers a logical '0' output data to said second and third output circuits if said first primary and first redundant processor module fails, said first logic circuit calculates a logical sum of output data received from said second and third logic circuit and asserts output data as said logical sum on its first and second output, thereby providing the system output as a result of two-out-of-two voting among output data generated by said second and third primary processor modules if said first primary and first redundant processor module fails;

l) said second logic circuit transfers a logical '0' output data to said second and third output circuits if said second primary and second redundant processor module fails, said second logic circuit calculates a logical sum of output data received from said first and third logic circuit and asserts output data as said logical sum on its first and second output, thereby providing the system output as a result of two-out-of-two voting among output data generated by said first and third primary processor modules if said second primary and second redundant processor module fails;

m) said third logic circuit transfers a logical '0' output data to said first and second output circuits if said third primary and third redundant processor module fails, said third logic circuit calculates a logical sum of output data received from said first and second logic circuit and asserts output data as said logical sum on its first and second output, thereby providing the system output as a result of two-out-of-two voting among output data generated by said first and second primary processor modules if said third primary and third redundant processor module fails;

n) said first and second logic circuit transfer a logical '0' output data to said third logic circuit, whereby the system output is a result of one-out-of-one voting with output data that said third logic circuit receives from the associated primary processor module if said first and second primary processor module fails, and also first and second redundant processor module fails;

o) said first and third logic circuit transfer a logical '0' output data to said second logic circuit, whereby the system output is a result of one-out-of-one voting with output data that said second logic circuit receives from the associated primary processor module if said first and third primary processor module fails, and also first and third redundant processor module fails;

p) said second and third logic circuit transfer a logical '0' output data to said first logic circuit, whereby the system output is a result of one-out-of-one voting with output data that said first logic circuit receives from the associated primary processor module if said second and third primary processor module fails, and also second and third redundant processor module fails; and q) said first, second, and third logic circuits transfer a logical '0' output data to each others, thereby driving the system output to a safe condition in the event that three said primary processor modules and three said redundant processors modules concurrently fail.

17. The multiple redundant control system of claim 16 wherein:

a) each said logic circuit includes means for checking said disparity flag for each controlled point and using output data produced by the associated primary processor module for controlled point where said disparity flag is not set;

b) each said logic circuit includes means for using output data received from the associated redundant processor module for controlled points where said disparity flag is set;

c) said first, second, and third logic circuits produces the system output as a result of two-out-of-three voting among output data generated by said first, second, and third primary processor modules for controlled points where said disparity flag is not set;

d) said first, second, and third logic circuits produces the system output as a result of two-out-of-three voting among output data generated by said first, second, and third redundant processor modules for controlled points where said disparity flag is set;

e) said first, second, and third logic circuits produces the system output as a result of two-out-of-three voting among output data generated by said first redundant processor module, second primary processor module and third primary processor module for controlled points where said disparity flag is set by said first primary processor module;

f) said first, second, and third logic circuits produces the system output as a result of two-out-of-three voting among output data generated by said first primary processor module, second redundant processor module and third primary processor module for controlled points where said disparity flag is set by said second primary processor module;

g) said first, second, and third logic circuits produces the system output as a result of two-out-of-three voting among output data generated by said first primary processor module, second primary processor module and third redundant processor module for controlled points where said disparity flag is set by said third primary processor module;

h) said first, second, and third logic circuits produces the system output as a result of two-out-of-three voting among output data generated by said first redundant processor module, second redundant processor module and third primary processor module for controlled points where said disparity flag is set by said first and second primary processor module;

i) said first, second, and third logic circuits produces the system output as a result of two-out-of-three voting among output data generated by said first redundant processor module, second primary processor module and third redundant processor module for controlled points where said disparity flag is set by said first and third primary processor module; and j) said first, second, and third logic circuits produces the system output as a result of two-out-of-three voting among output data generated by said first primary processor module, second redundant processor module and third redundant processor module for controlled points where said disparity flag is set by second and third primary processor module.

18. The multiple redundant control system of claim 17 wherein:

a) each said logic circuit connected to the associated voter network for detecting faults in said voter network and for activating an emergency signal that disables outputs of said voter network in the event that said voter network fails;

b) said system output is produced as a result of two-out-of-three voting among output data that said first, second, and third logic circuits receive from the associated primary processor modules if said emergency signal in each said logic circuit is not activated;

c) said system output is produced as a result of two-out-of-two voting among output data that two said logic circuits receive from the associated primary processor modules in the event that one voter network fails and said associated emergency signal is activated;

d) said system output is produced as a result of one-out-of-one voting of output data that one said logic circuit receive from the associated primary processor module if two voter networks fail and said associated emergency signals are activated;

e) said system output is driving to a safe condition if three voter networks fail and said associated emergency signals are activated;

f) said output circuit further comprising a first, a second, and a third watchdog timer each of which is set for a predetermined period of time, and respectively connected to said first, second, and third logic circuits for detecting the occurrence of a fault in the associated logic circuit and for activating an alarm signal in the event that the associated logic circuits fail;

g) said system output is produced as a result of two-out-of-three voting among output data that said first, second, and third logic circuits receive from the associated processor modules if said alarm signal in each watchdog timer is not activated;

h) said system output is produced as a result of two-out-of-two voting among output data that two logic circuits received from the associated processor modules if said alarm signal associated with the faulty logic circuit is activated;

i) said system output is produced as a result of one-out-of-one voting of output data that said one logic circuit receive from the associated processor module if two said alarm signals associated with two faulty logic circuits are activated;

j) said system output is disabled if three said alarm signals associated with three faulty logic circuits are activated, said system output is driven to a safe condition when three said logic circuits fail; and k) each said logic circuit utilizes single error-correcting and double error-detecting codes for detecting communication errors in the output data that said logic circuit receives from said neighboring logic circuits, said logic circuit asserts its output data on both said first and second outputs if said communication errors are detected but not corrected, thereby providing correct output data on the system output in the presence of said communication errors.

19. The multiple redundant control system of claim 18 wherein:

a) each said logic circuit is implemented as an application specific integrated circuit (ASIC) to decrease susceptibility of said associated output module to a common cause failure;

b) said ASIC utilizes a two-out-of-three majority voting configuration for providing uninterrupted operation of said logic circuit in the presence of any single fault, thereby increasing reliability of said logic circuit; and c) said ASIC is protected against electromagnetic interference for further increasing reliability of said logic circuit.

20. The multiple redundant control system of claim 12 wherein:

a) said first, second, and third redundant processor modules are located on a common board as a one triple module unit, said triple module unit configured to be on-line removed and replaced in the event that at least one redundant processor module fails.

21. The multiple redundant control system of claim 12 wherein:

a) said first, second, and third redundant processor modules are implemented as a single-chip redundant processor unit to provide a compact configuration of said redundant processor modules, thereby decrease complexity of the system;

b) said redundant processor unit utilizes a two-out-of-three majority voting configuration for providing said redundant processor unit uninterrupted operation in the presence of any single fault, thereby increasing reliability of said redundant processor unit;

c) said redundant processor unit is radiation hardened and protected against electromagnetic interference for further increasing reliability of said redundant processor unit; and d) said redundant processor unit configured to be on-line removed and replaced in the event that said redundant processor unit fails.

22. The multiple redundant control system of claim 12 wherein:

a) the primary processor module further comprising means for loading a primary control program and a redundant control program, said primary and redundant control programs are used respectively by said primary and said redundant processor modules to implement the same tasks, but said primary and redundant control programs are different in software code for decreasing the probability of a common design failure;

b) said first, second, and third primary processor modules are respectively connected to said first, second, and third redundant processor modules, wherein each said primary processor module is able to load said redundant control program on-line to the associated redundant processor module and to send the command to the associated redundant processor to begin execution of said redundant control program synchronously with the execution of said primary control program; and c) each said redundant processor module has means for verifying the integrity of the redundant control program, and if errors in said redundant control program are discovered the redundant control program is received from one of its neighbor redundant processor modules.

* * * * *